(12) United States Patent
Sittig et al.

(10) Patent No.: US 12,113,840 B2
(45) Date of Patent: Oct. 8, 2024

(54) FEATURES FOR ONLINE DISCUSSION FORUMS

(71) Applicant: Alpha Exploration Co., San Francisco, CA (US)

(72) Inventors: Aaron Sittig, San Francisco, CA (US); Molly Nix, San Francisco, CA (US); Patrick Underwood, San Francisco, CA (US); Paul Davison, San Francisco, CA (US); Rohan Seth, San Francisco, CA (US)

(73) Assignee: ALPHA EXPLORATION CO., San Francisco, CA (US)

( * ) Notice: Subject to any disclaimer, the term of this patent is extended or adjusted under 35 U.S.C. 154(b) by 0 days.

(21) Appl. No.: 17/875,742

(22) Filed: Jul. 28, 2022

(65) Prior Publication Data

US 2023/0032642 A1 Feb. 2, 2023

Related U.S. Application Data

(60) Provisional application No. 63/327,635, filed on Apr. 5, 2022, provisional application No. 63/255,291, filed on Oct. 13, 2021, provisional application No. 63/242,955, filed on Sep. 10, 2021, provisional application No. 63/236,531, filed on Aug. 24, 2021, provisional application No. 63/226,403, filed on Jul. 28, 2021.

(51) Int. Cl.
*H04L 65/403* (2022.01)
*G06F 3/0482* (2013.01)

(52) U.S. Cl.
CPC .......... *H04L 65/403* (2013.01); *G06F 3/0482* (2013.01)

(58) Field of Classification Search
CPC ............................ H04L 65/403; G06F 3/0482
See application file for complete search history.

(56) References Cited

U.S. PATENT DOCUMENTS

| | | | |
|---|---|---|---|
| 2007/0263821 A1* | 11/2007 | Shaffer | H04M 3/42187 379/202.01 |
| 2009/0013086 A1 | 1/2009 | Greenbaum | |
| 2016/0100295 A1* | 4/2016 | Pinard | H04W 4/06 455/518 |
| 2016/0203831 A1 | 7/2016 | Elyashiv et al. | |

FOREIGN PATENT DOCUMENTS

| | | |
|---|---|---|
| WO | 01/53964 A1 | 7/2001 |
| WO | 01/61551 A1 | 8/2001 |

OTHER PUBLICATIONS

International Search Report and Written Opinion mailed on Nov. 7, 2022, in corresponding PCT/US2022/038680, 10 pages.

* cited by examiner

*Primary Examiner* — Stephen S Hong
*Assistant Examiner* — Darrin Hope
(74) *Attorney, Agent, or Firm* — XSENSUS LLP

(57) ABSTRACT

A method for generating an online audio discussion forum. The method includes receiving an indication that a first user is interested in speaking with one or more other users, saving the one or more other users to a first selection list, determining that a second user of the one or more other users is interested in speaking with the first user, and upon and in response to the determination, generating an audio discussion forum including the first user and the second user.

22 Claims, 31 Drawing Sheets

FEATURES FOR ONLINE DISCUSSION FORUMS

CROSS-REFERENCE TO RELATED APPLICATIONS

This application claims priority to and the benefit of U.S. Provisional Patent Application No. 63/226,403 titled "FEATURES FOR ONLINE DISCUSSION FORUMS" and filed on Jul. 28, 2021, U.S. Provisional Patent Application No. 63/236,531 titled "FEATURES FOR ONLINE DISCUSSION FORUMS" and filed on Aug. 24, 2021, U.S. Provisional Patent Application No. 63/242,955 titled "FEATURES FOR ONLINE DISCUSSION FORUMS" and filed on Sep. 10, 2021, U.S. Provisional Patent Application No. 63/255,291 titled "FEATURES FOR ONLINE DISCUSSION FORUMS" and filed on Oct. 13, 2021, and U.S. Provisional Patent Application No. 63/327,635 titled "FEATURES FOR ONLINE DISCUSSION FORUMS" and filed on Apr. 5, 2022, the entire contents of which are hereby incorporated by reference herein.

TECHNICAL FIELD

This specification relates to online discussion forums and, in particular, to online audio discussion forums in which users participate as speakers and audience members in virtual audio rooms.

BACKGROUND

An online discussion forum such as a message board, or a social media website, provides an online forum where users can hold discussions by posting messages. In message boards, text-based messages posted for a particular topic can be grouped into a thread, often referred to as a conversation thread. A user interface (e.g., a web page) for an online forum can contain a list of threads or topics. In social media websites, users are typically followed by other users and/or select other users to follow. In this context, "follow" means being able to see content posted by the followed user. Users typically select other users to follow based on the identity of the other users, which is provided by the social media platform, e.g., by providing a real name, a user name, and/or a picture. However, text-based online discussion forums and social media websites can have slow moving discussions where messages or posts are exchanged over long periods of time (hours, days, etc.). As such, these online discussions can be less interactive and dynamic relative to in-person discussions or telephone discussions.

SUMMARY

At least one aspect of the present disclosure is directed to a method for generating an online audio discussion forum. The method includes receiving an indication that a first user is interested in speaking with one or more other users, saving the one or more other users to a first selection list, determining that a second user of the one or more other users is interested in speaking with the first user, and upon and in response to the determination, generating an audio discussion forum including the first user and the second user.

In one embodiment, generating the audio discussion forum including the first user and the second user includes sending an invite to join the audio discussion forum to the second user. In some embodiments, determining that the second user is interested in speaking with the first user includes receiving an indication that the second user is interested in speaking with one or more other users, saving the one or more other users to a second selection list, and detecting that the first user is included in the second selection list. In various embodiments, the method includes displaying a first user list to the first user, the first user list including at least one user other than the first user and displaying a second user list to the second user, the second user list including at least one user other than the second user. In certain embodiments, the method includes sorting the first user list based on criteria associated with the first user and sorting the second user list based on criteria associated with the second user.

In some embodiments, the first user list and the second user list are different lists. In one embodiment, receiving the indication that the first user is interested in speaking with the one or more other users includes receiving a selection by the first user of the one or more other users from the first user list. In certain embodiments, receiving the indication that the second user is interested in speaking with the one or more other users includes receiving a selection by the second user of the one or more other users from the second user list. In various embodiments, receiving the indication that the first user is interested in speaking with the one or more other users includes receiving a selection by the first user of the one or more other users via a user profile corresponding to the one or more other users.

In one embodiment, receiving the indication that the second user is interested in speaking with the one or more other users includes receiving a selection by the second user of the one or more other users via a user profile corresponding to the one or more other users. In some embodiments, the method includes receiving an indication that a third user is interested in speaking with one or more other users and saving the one or more other users to a third selection list. In various embodiments, the method includes comparing the first, second, and third selection lists and sending an invite to the third user to join the audio discussion forum in response to a determination that the first selection list includes the second and third users, the second selection list includes the first and third users, and the third selection list includes the first and second users. In certain embodiments, the method includes comparing the first, second, and third selection lists and sending an invite to the third user to join the audio discussion forum in response to a determination that the first selection list includes the third user and/or the second selection list includes the third user.

Another aspect of the present disclosure is directed to a system for generating an online audio discussion forum. The system includes at least one memory for storing computer-executable instructions and at least one processor for executing the instructions stored on the memory. Execution of the instructions programs the at least one processor to perform operations that include receiving an indication that a first user is interested in speaking with one or more other users, saving the one or more other users to a first selection list, determining that a second user of the one or more other users is interested in speaking with the first user, and upon and in response to the determination, generating an audio discussion forum including the first user and the second user.

In one embodiment, generating the audio discussion forum including the first user and the second user includes sending an invite to join the audio discussion forum to the second user. In some embodiments, determining that the second user is interested in speaking with the first user includes receiving an indication that the second user is interested in speaking with one or more other users, saving the one or more other users to a second selection list, and detecting that the first user is included in the second selection list. In various embodiments, execution of the instructions programs the at least one processor to perform operations that include displaying a first user list to the first user, the first user list including at least one user other than the first user and displaying a second user list to the second user, the second user list including at least one user other than the second user. In certain embodiments, execution of the instructions programs the at least one processor to perform operations that include sorting the first user list based on criteria associated with the first user and sorting the second user list based on criteria associated with the second user.

In some embodiments, the first user list and the second user list are different lists. In one embodiment, receiving the indication that the first user is interested in speaking with the one or more other users includes receiving a selection by the first user of the one or more other users from the first user list. In certain embodiments, receiving the indication that the second user is interested in speaking with the one or more other users includes receiving a selection by the second user of the one or more other users from the second user list. In various embodiments, receiving the indication that the first user is interested in speaking with the one or more other users includes receiving a selection by the first user of the one or more other users via a user profile corresponding to the one or more other users.

In one embodiment, receiving the indication that the second user is interested in speaking with the one or more other users includes receiving a selection by the second user of the one or more other users via a user profile corresponding to the one or more other users. In some embodiments, execution of the instructions programs the at least one processor to perform operations that include receiving an indication that a third user is interested in speaking with one or more other users and saving the one or more other users to a third selection list. In various embodiments, execution of the instructions programs the at least one processor to perform operations that include comparing the first, second, and third selection lists and sending an invite to the third user to join the audio discussion forum in response to a determination that first selection list includes the second and third users, the second selection list includes the first and third users, and the third selection list includes the first and second users. In certain embodiments, execution of the instructions programs the at least one processor to perform operations that include comparing the first, second, and third selection lists and sending an invite to the third user to join the audio discussion forum in response to a determination that first selection list includes the third user and/or the second selection list includes the third user.

DETAILED DESCRIPTION

Figure 1:
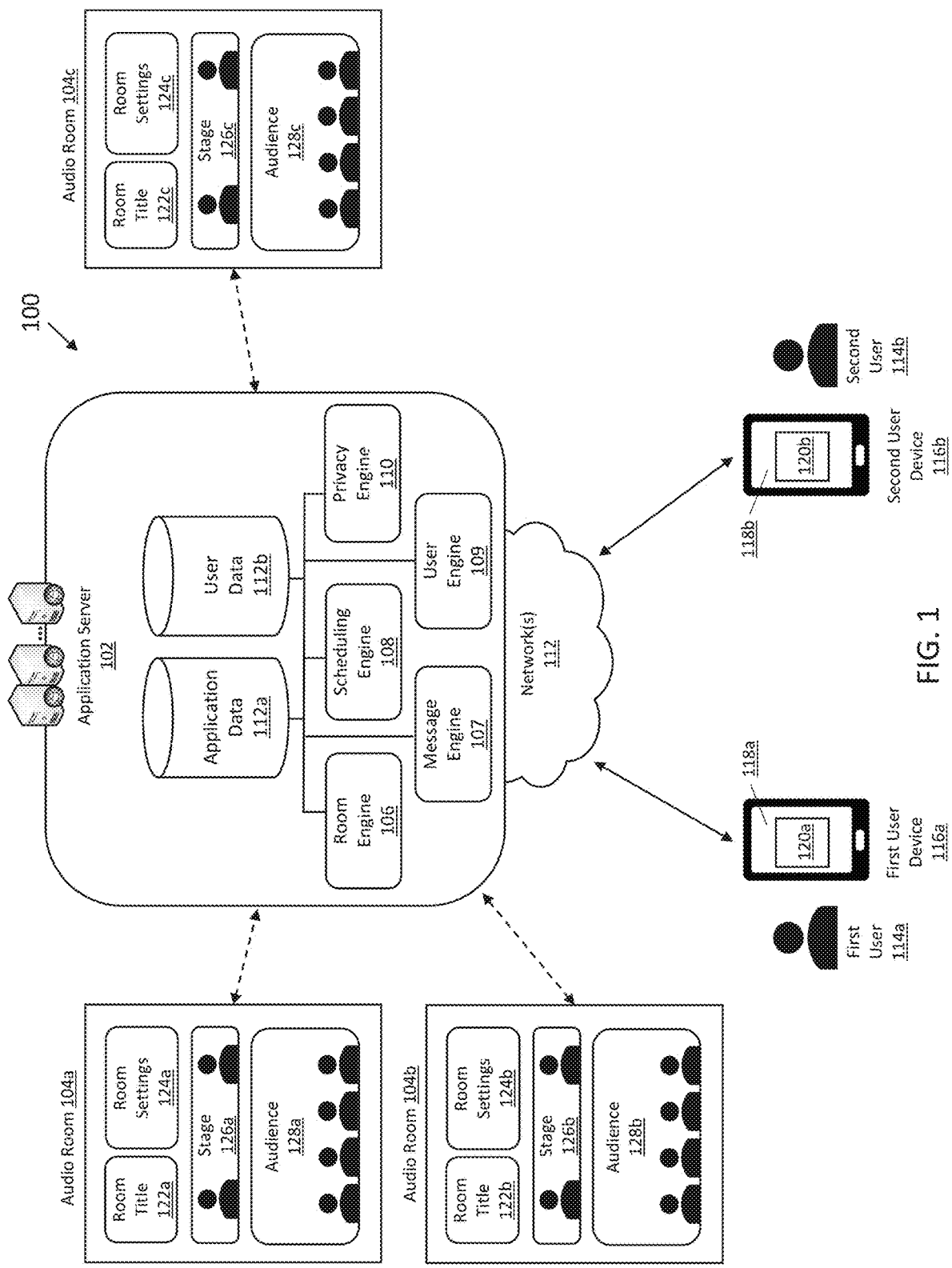
FIG. 1 illustrates a block diagram of a system for providing online audio discussion forums in accordance with aspects described herein.

FIG. 1 is a block diagram of a system 100 for providing online audio discussion forums (i.e., rooms) in accordance with aspects described herein. In one example, the system 100 is implemented by an application server 102. The application server 102 provides functionality for creating and providing one or more audio rooms 104. The application server 102 comprises software components and databases that can be deployed at one or more data centers (not shown) in one or more geographic locations, for example. The application server 102 software components may include a room engine 106, a message engine 107, a scheduling engine 108, a user engine 109, and a privacy engine 110. The software components can comprise subcomponents that can execute on the same or on a different individual data processing apparatus. The application server 102 databases may include an application database 112 and a user database 114. The databases can reside in one or more physical storage systems. Example features of the software components and data processing apparatus will be further described below.

The application server 102 is configured to send and receive data (including audio) to and from users' client devices through one or more data communication networks 112 such as the Internet, for example. A first user 114a can access a user interface (e.g., user interface 120a) of a client application (e.g., client application 118a) such as a web browser or a special-purpose software application executing on the user's client device (e.g., first user device 116a) to access the one or more audio rooms 104 implemented by the application server 102. Likewise, a second user 114b can access a user interface (e.g., user interface 120b) of a client application (e.g., client application 118b) executing on the user's client device (e.g., second user device 116b). In one example, the user interfaces 120a, 120b and the client applications 118a, 118b are substantially the same. In some examples, the client applications 118a, 118b may provide or display user-specific content.

Although this application will describe many functions as being performed by application server 102, in various implementations, some or all functions performed by application server 102 may be performed locally by a client application (e.g., client applications 118a, 118b). The client application can communicate with the application server 102 over the network(s) 112 using Hypertext Transfer Protocol (HTTP), another standard protocol, or a proprietary protocol, for example. A client device (e.g., user devices 116a, 116b) can be a mobile phone, a smart watch, a tablet computer, a personal computer, a game console, or an in-car media system. Other types of client devices are possible.

In various implementations, the system 100 can enable online discussion between users in virtual audio forums (e.g., audio rooms 104). As shown, each of the audio rooms 104 can include a room title 122, room settings 124, a stage 126, and an audience 128. In one example, the title 122 corresponds to a pre-determined topic or subject of the discussion within each audio room 104. The users in each audio room 104 can be grouped as speakers or audience members (i.e., listeners). As such, the stage 126 may include one or more speakers (i.e., users with speaking privileges) and the audience 128 may include one or more audience members (i.e., users without speaking privileges).

In one example, users can navigate between various audio rooms as speakers and audience members via the client application 118. For example, the first user 114a may start a new audio room (e.g., 104a) as a speaker. In some examples, when starting the audio room 104a, the first user 114a may configure the room title 122a and the room settings 124a. The first user 114a may invite the second user 114 (or any other user) to join the first audio room 104a as a speaker or as an audience member. The second user 114 may accept the invitation to join the first audio room 104a, join a different audio room (e.g., 104b), or start a new audio room (e.g., 104c).

In one example, the room engine 106 of the application server 102 is configured to generate and/or modify the audio rooms 104. For example, the room engine 106 may establish the room title 122 and the room settings 124 based on user input provided via the client application 118 and/or user preferences saved in the user database 112b. In some examples, users can transition from speaker to audience member, or vice versa, within an audio room. As such, the room engine 106 may be configured to dynamically transfer speaking privileges between users during a live audio conversation. In certain examples, the audio rooms 104 may be launched by the room engine 106 and hosted on the application server 102; however, in other examples, the audio rooms 104 may be hosted on a different server (e.g., an audio room server).

The message engine 107 is configured to provide messaging functions such that users can communicate on the platform outside of audio rooms. In one example, the message engine 107 enables text-based messaging between users. The message engine 107 may be configured to support picture and/or video messages. In some examples, the message engine 107 allows users to communicate in user-to-user chat threads and group chat threads (e.g., between three or more users).

The scheduling engine 108 is configured to enable the scheduling of future audio rooms to be generated by the room engine 106. For example, the scheduling engine 108 may establish parameters for a future audio room (e.g., room title 122, room settings 124, etc.) based on user input provided via the client application 118. In some examples, the future audio room parameters may be stored in the application database 112a until the scheduled date/time of the future audio room. In other examples, the application database 112a may store the future audio room parameters until the room is started by the user via the client application 118.

The user engine 109 is configured to manage user relationships. For example, the user engine 109 can access the user database 112b to compile lists of a user's friends (or co-follows), external contacts, etc. In some examples, the user engine 109 can monitor and determine the status of a user. The user engine 109 may determine which users are online (e.g., actively using the platform) at any given time. In certain examples, the user engine 109 is configured to monitor the state of the client application 118 on the user device 116 (e.g., active, running in the background, etc.).

The privacy engine 110 is configured to establish the privacy (or visibility) settings of the audio rooms 104. The privacy settings of each audio room 104 may be included as part of the room settings 124. In one example, the privacy settings correspond to a visibility level of the audio room. For example, each audio room may have a visibility level (e.g., open, social, closed, etc.) that determines which users can join the audio room. In some examples, the visibility level of the audio room may change based on a speaker in the audio room, behavior in the audio room, etc. As such, the privacy engine 110 can be configured to dynamically adjust the visibility level of the audio room. In certain examples, the privacy engine 110 can suggest visibility level adjustments (or recommendations) to the speaker(s) in the audio room.

Figure 2:
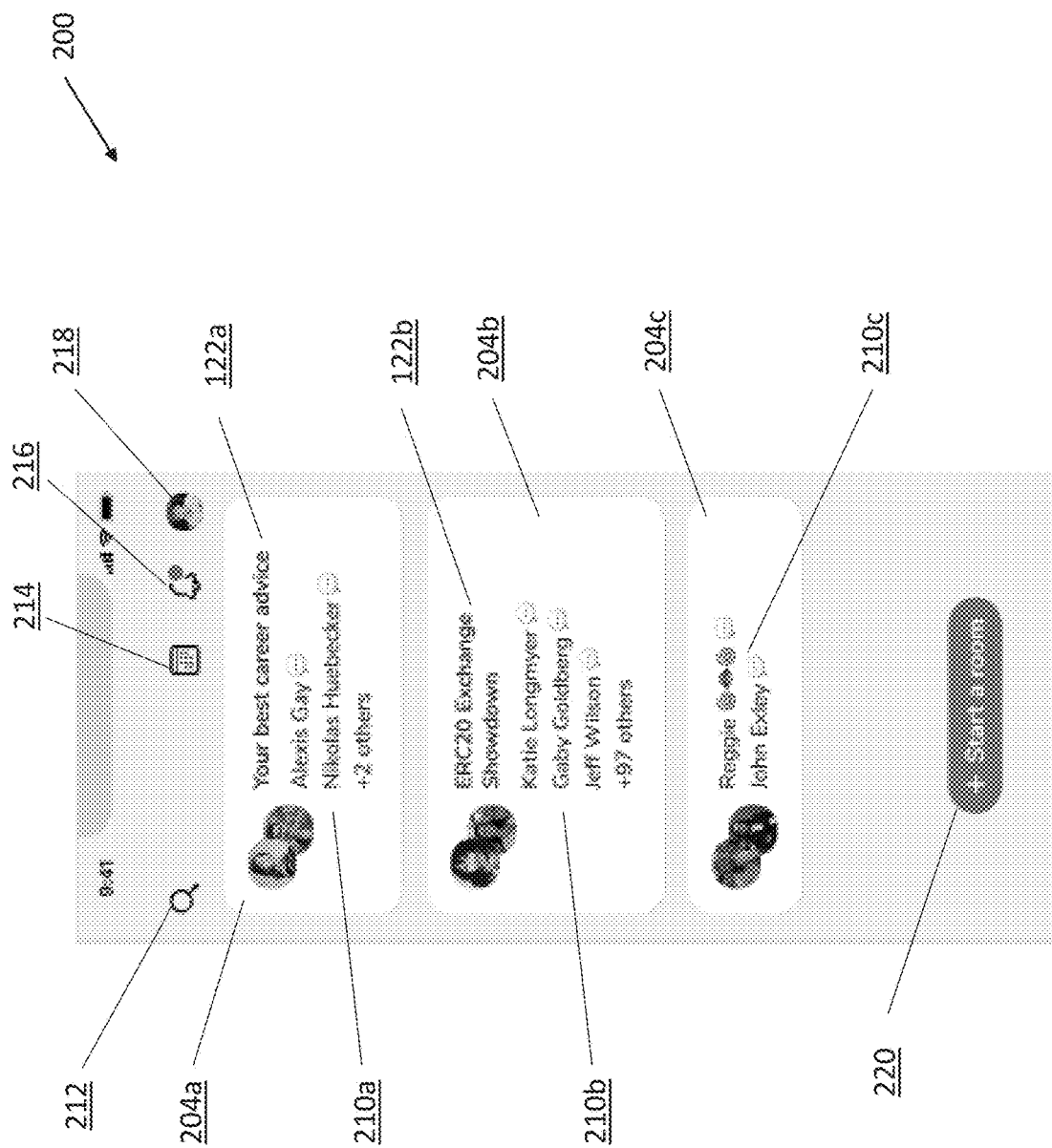
FIG. 2 illustrates a user interface of a client application in accordance with aspects described herein.

FIG. 2 is an example view 200 of the user interface 120 in accordance with aspects described herein. In one example, view 200 of the user interface 120 corresponds to a homepage of the client application 118. FIG. 2 and other figures presenting user interfaces in this application include icons and labels and refer to various features displayed by the user interface (e.g., search, schedule, notifications, etc.). While such icons and labels will be used to reference and describe such features in this application, the features may be presented with different icons and labels as well.

As shown, the user interface 120 can display live and/or upcoming audio rooms to the user. For example, home page 200 includes a first audio room tile 204a corresponding to the first audio room 104a having a title 122a named "Your best career advice," a second audio room tile 204b corresponding to the second audio room 104b having a title 222b named "ERC20 Exchange Showdown," and a third audio room tile 204c corresponding to the third audio room 104c. The audio rooms tiles 204 may be displayed in a scrollable list referred to as a "hallway." In one example, the room engine 106 of the application server 102 is configured to select the audio rooms displayed to the user based on data from the application database 112a and/or the user database 112b. As shown, a list of users 210 associated with each audio room can be displayed in the audio room tiles 204 under the title of the audio room 122. In one example, the list of users 210 represents the current speakers in the audio room; however, in other examples, the list of users 210 may represent a different group of users (e.g., original speakers, all users, etc.). The user may join any of the audio rooms represented by the displayed audio room tiles 204 by selecting (e.g., tapping) on a desired audio room tile 204.

The user interface 120 may include icons representing various functions. For example, view 200 of the user interface 120 includes icons corresponding to an explore function 212, a calendar function 214, a notification function 216, a user profile function 218, and a new room function 220. In some examples, the functions are configured to be performed by various combinations of the system engine 106, the scheduling engine 108, and the privacy engine 110 of the application server 102.

In one example, the explore function 212 allows the user to search for different users and clubs. The explore function 212 may allow the user to search for other users by name (or username) and clubs by title (i.e., topic). For example, the user may use the explore function 212 to find clubs related to specific topics (e.g., finance, TV shows, etc.). Likewise, the user may use the explore function 212 to view the clubs that specific users are members of. In some examples, the explore function 212 may be performed, at least in part, by the room engine 106 of the application server 102.

The calendar function 214 is configured to display upcoming audio rooms associated with the user. In one example, the calendar function 214 may display upcoming audio rooms where the user is a speaker and/or audio rooms that the user has indicated interest in attending. For example, the calendar function 214 may display upcoming audio rooms where at least one speaker is followed by the user and audio rooms associated with clubs that the user is a member of. In some examples, the calendar function 214 is performed, at least in part, by the scheduling engine 108 of the application server 102. Likewise, the notification function 216 is configured to notify the user of user-specific notifications. For example, the notification function 216 may notify the user of an event (e.g., upcoming audio room), the status of a user follow request, etc.

In some examples, the user profile function 218 allows the user to view or update user-specific settings (e.g., privacy preferences). Likewise, the user profile function 218 allows the user to add/modify user parameters stored in the user database 112b. In some examples, the user profile function 218 may provide the user with an overview of their own social network. For example, the user profile function 218 can display other users who follow the user, and vice versa. The user profile function 218 may be performed, at least in part, by the privacy engine 110 of the application server 102.

In one example, the new room function 220 allows the user to start a new audio room. In some examples, the new room function 220 may be performed by the room engine 106 and/or the scheduling engine 108.

Figure 3:
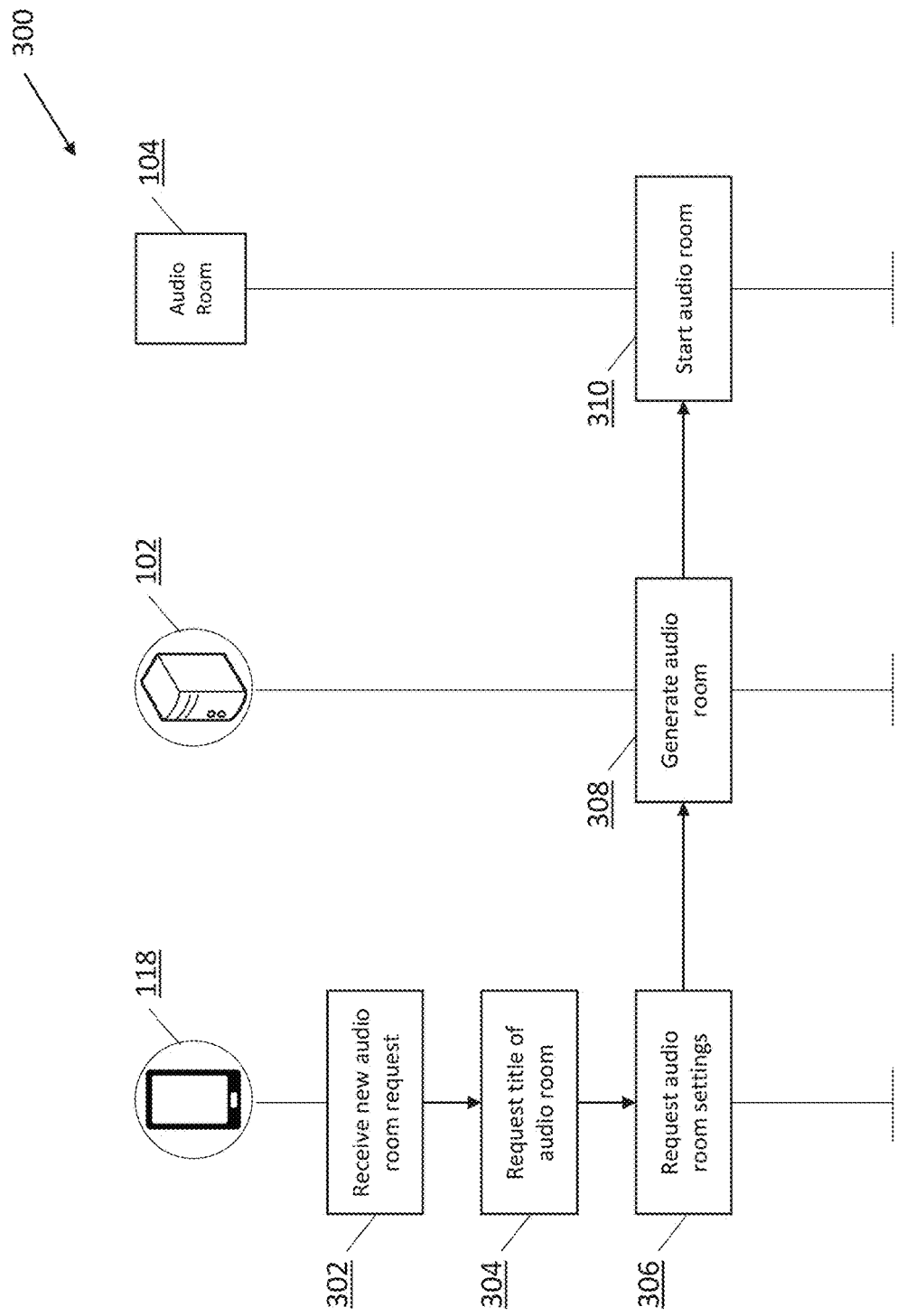
FIG. 3 illustrates a flow diagram of a method for starting an audio room in accordance with aspects described herein.

FIG. 3 is a flow diagram of a method 300 for starting an audio room in accordance with aspects described herein. In one example, the method 300 includes assigning a title to the audio room (e.g., room title 122). In some examples, the method 300 corresponds to a process carried out by the application server 102 and the client application 118.

At step 302, the client application 118 receives a request to start a new audio room 104. In one example, the user may request a new audio room via the user interface 120 of the client application 118. For example, the user may request a new audio room 104 by selecting (e.g., tapping) a button within the user interface 120 corresponding to the new room function 220, as shown in FIG. 2.

Figure 4A:
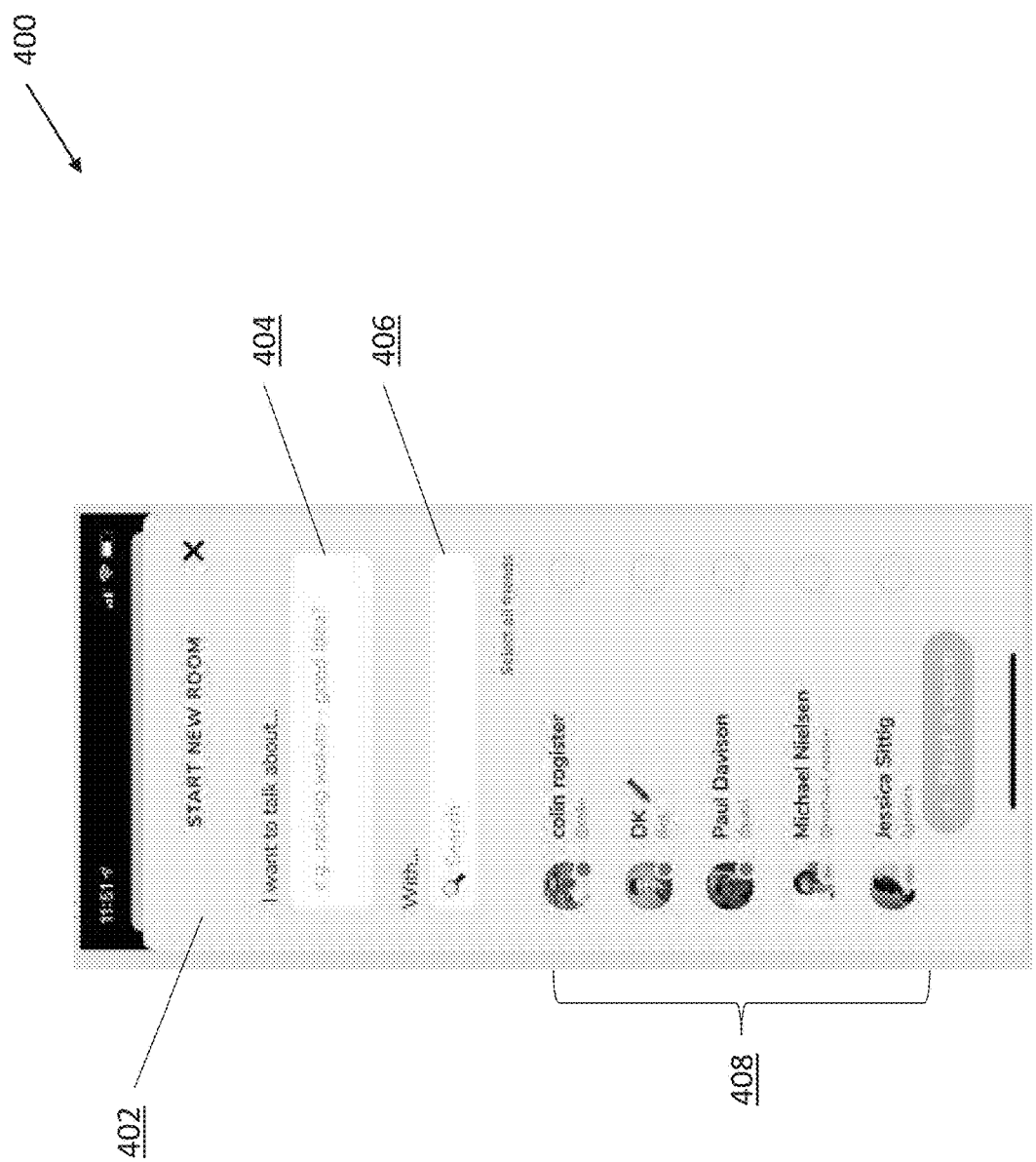
FIG. 4A-4B illustrate a user interface of a client application in accordance with aspects described herein.

At step 304, the client application 118 is configured to request a room title 122 for the audio room 104. In one example, the user interface 120 displays a tab (or window) for the user 114 to enter a desired room title 122. For example, FIG. 4A is an example view 400 of the user interface 120 having a new room tab 402. As shown, the new room tab 402 includes an entry box 404 for the user to enter the room title 122. The room title 122 corresponds to a topic or subject that the user intends to talk about (e.g., "Your best career advice"). In some examples, the room title 122 may correspond to an event (e.g., holiday, birthday, etc.). In certain examples, the room title 122 may be the name of person or include the name of a person (e.g., "Happy Birthday John"). The room title 122 may include various combinations of letters, numbers, and/or images (e.g., emojis).

At step 306, the client application 118 is configured to request parameters for the audio room 104. In one example, the room parameters include users to be invited as speakers or audience members. For example, as shown in FIG. 4A, the new room tab 402 includes a search box 406. The user may use the search box 406 to find other users to invite to the audio room 104. In some examples, the new room tab 402 includes a scrollable list 408 of the user's friends, or a portion of the user's friends (e.g., top friends). In this context, "friend" corresponds to a second user who follows a first user and/or is followed by the first user (i.e., co-followed). As such, the user may use the search box 406 and/or the scrollable list 408 to find/select users to be invited to the audio room 114. While not shown, the new room tab 402 may include additional room settings (e.g., privacy or visibility levels).

At step 308, the application server 102 is configured to generate the audio room 104. The application server 102 receives the audio room information (e.g., title and parameters) from the client application 118. In one example, the room engine 106 of the application server 102 is configured to generate an audio room instance based on the received audio room information. In some examples, the room engine 106 sends notifications to the users who are being invited to the join the audio room 104 as speakers and/or audience members.

At step 310, the application server 102 starts the audio room 104. In one example, the room engine 106 is configured to start the audio room 104 by launching the generated audio room instance on the application server 102 (or a different server). In some examples, once started, the audio room 104 may become visible to other users. For example, the title 122 of the audio room 104 may become visible to users who follow the speaker(s) of the audio room via the calendar function 214 (shown in FIG. 2). As such, these users may discover and join the audio room 104. Likewise, once started, the audio room 104 may be made visible to friends of the user 114. For example, the audio room 104 may appear on the homepages (e.g., view 200 of FIG. 2) of other users who are friends with the user.

Figure 4B:
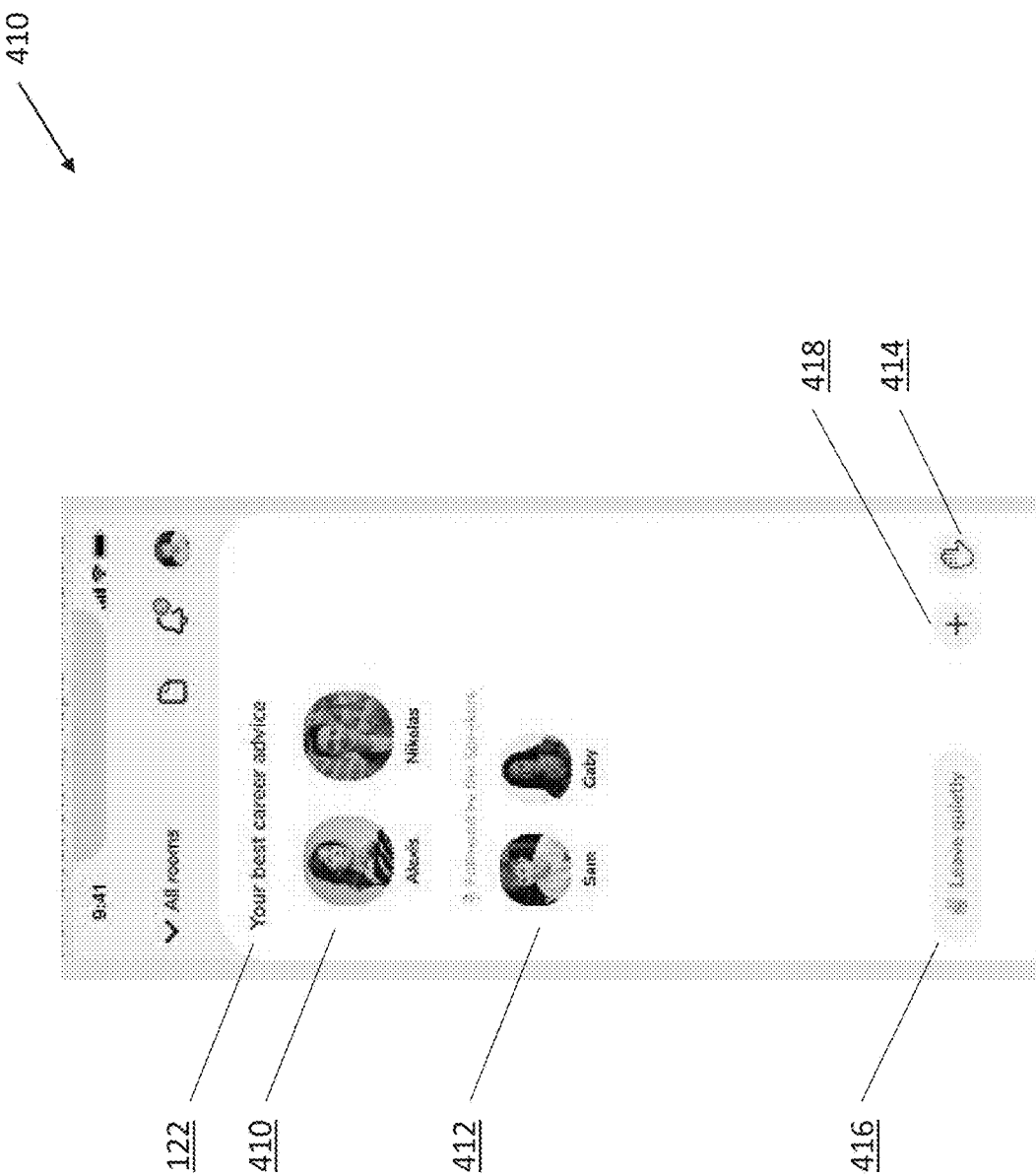

FIG. 4B is an example view 410 of the user interface 120. In one example, the view 410 corresponds to the live audio room 104 from the perspective of an audience member. As shown, the room title 122 is displayed along with a speaker list 410. The speaker list 410 indicates the current speakers in the audio room 114. In some examples, an audience list 412 is displayed indicating the audience members who are followed by (or friends with) the speaker(s). In other examples, the audience list 412 may include all audience members (i.e., including those not followed by the speakers). A speaker request button 414 is included allowing audience members to request speaking privileges. For example, audience members may be transitioned from the audience 128 to the stage 126 at the discretion of at least one speaker (e.g., a moderator). An exit button 416 is included allowing users to leave the audio room 104. It should be appreciated that all users (speakers and audience members) may leave the audio room 104 at any time. In some examples, the speakers (including the original speaker(s)) can leave the audio room 104 without ending or stopping the audio room 104.

In some examples, assigning a title to the audio room 104 can improve the likelihood of the audio room 104 being successful. For example, by assigning a title to the audio room 104, users may decide if they are interested in participating in the discussion before joining the audio room. As such, users may find and join audio rooms of interest, leading to larger audiences, new speakers, and longer, high-quality discussions.

As shown in FIG. 4B, the user interface 120 includes a ping user button 418. The user (e.g., speaker or audience member) can select the ping user button 418 to invite or "ping" users to join the audio room 104.

Pinging Users into Audio Rooms

Figure 5:
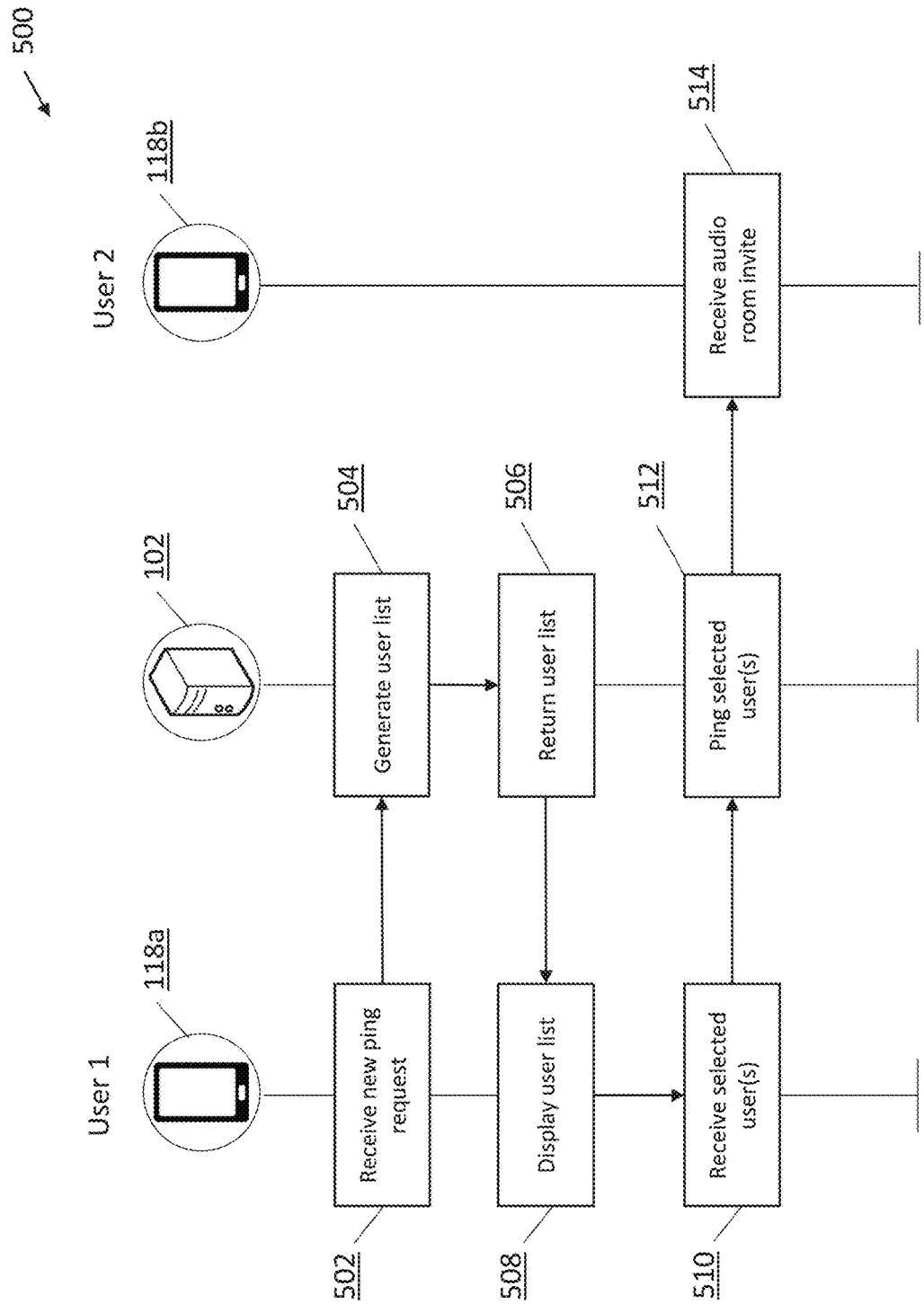
FIG. 5 illustrates a flow diagram of a method for pinging users into an audio room in accordance with aspects described herein.

FIG. 5 is a flow diagram of a method 500 for pinging users into an audio room in accordance with aspects described herein. In one example, the method 500 includes pinging users into an audio room based on the speaker(s). In some examples, the method 500 corresponds to a process carried out by the application server 102 and the client application 118.

At step 502, the client application 118a receives a new ping request from the first user 114a in the audio room 104. In one example, the first user 114a is a speaker in the audio room 104. The first user 114a may request to ping one or more users via the user interface 120a of the client application 118a. For example, the first user 114a may request to ping one or more users by selecting (e.g., tapping) a button within the user interface 120a (e.g., ping user button 418 of FIG. 4B).

At step 504, the application server 102 is configured to generate a user list corresponding to the received ping request. The application server 102 receives information corresponding to the first user 114a and the audio room 104 from the client application 118a. In one example, the user engine 109 of the application server 102 is configured to generate the user list based on the received user and audio room information. For example, the user engine 109 can compile a list of users who co-follow the speaker(s) in the audio room 104. If there are two or more speakers in the audio room 104, the user engine 109 may filter the list of co-followed users down to a list of users who are co-followed by at least two of the speakers. In some examples, the user engine 109 is configured to sort the list of co-followed users based on priority. For example, users who are co-followed by three speakers may appear higher in the list than users who are co-followed by two speakers, and so on. In one example, the sorted list of co-followed users is saved by the room engine 106 as a User Set A.

In some examples, the user engine 109 is configured to prepend the speakers in the audio room 104 to User Set A, and to save the modified User Set A as a new User Set B. In certain examples, the number of speakers saved to User Set B is capped at a certain threshold (e.g., first 20 speakers). The user engine 109 can compile a list of contacts of the users included in User Set B. For example, the contacts may be based on information provided by the user (e.g., contact list) and/or information sourced from another database, such as an external social network. In this context, "contacts" refers to both individuals who have user accounts on the platform and those that do not. In some examples, the user engine 109 is configured to sort the list of contacts based on priority. For example, contacts who are shared between three users included in User Set B may appear higher in the list than contacts who are shared between two users included in User Set B, and so on. In one example, the sorted list of contacts is saved by the room engine 106 as User Set C.

The user engine 109 can filter User Sets A, B, and C based on information corresponding to the first user 114a. For example, the user engine 109 may filter User Set A such that only users the first user 114a has permission to ping are included (e.g., users that co-follow the first user 114a). In certain examples, the number of users included in User Set A is capped at a certain threshold (e.g., top 8 users), and the user engine 109 may remove any users from User Set A that exceed the threshold. In one example, this filtered User Set A represents a "mutual user set" for the first user 114a. Likewise, the user engine 109 may filter User Set B such that only contacts associated with the first user 114a are included (e.g., from the user's own contact list). This filtered User Set B represents a "external user set" for the first user 114a. In some examples, the user engine 109 is configured to remove any online (e.g., currently active) users from the mutual user set (i.e., filtered User Set A) and the external user set (i.e., filtered User Set B). The online users can be saved in a new "online user set" for the first user 114a. In one example, the user engine 109 is configured to combine the user sets into an master user list. For example, the master user list may include the users sets in the order of: mutual user set, external user set, and online user set.

At step 506, the user engine 109 of the application server 102 is configured to return the user list corresponding to the first user 114a and the audio room 104 to the client application 118a. In one example, the user engine 109 is configured to return the ordered master user list; however, in other examples, the user engine 109 may return a different user list (e.g., the mutual user set, the external user set, etc.).

Figure 6A:
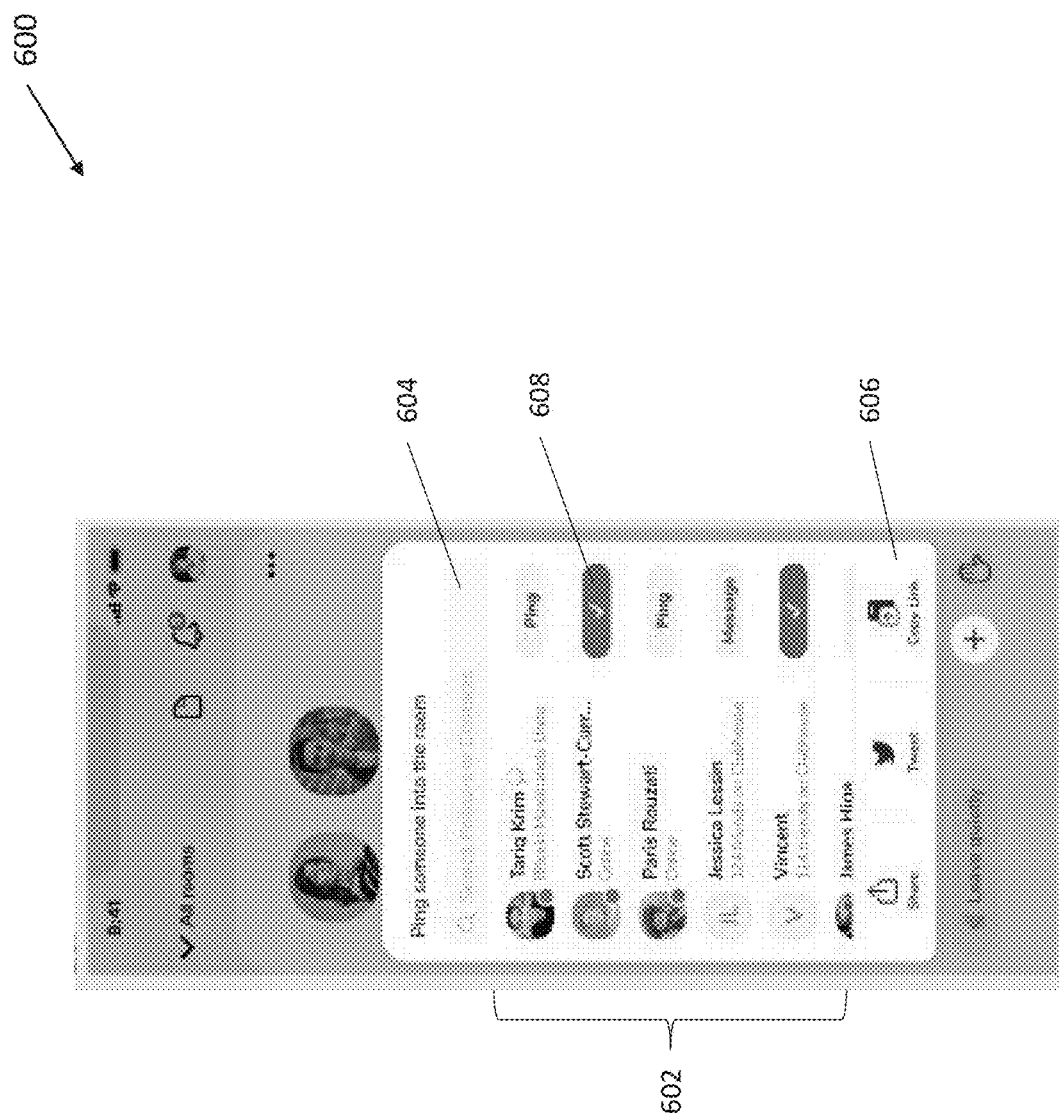
FIGS. 6A-6D illustrate a user interface of a client application in accordance with aspects described herein.

At step 508, the client application 118a is configured to receive and display the user list. FIG. 6A is an example view 600 of the user interface 120a. In one example, the view 600 corresponds to the view presented to the first user 114a after selecting the ping user button 418 of FIG. 4B. As shown, the user interface 120a provides a scrollable user list 602, a search box 604, a share bar 606, and a plurality of ping buttons 608. In some examples, the user list 602 corresponds to the ordered master user list received from the application server 102. For example, the users in the user list 602 may be ordered such that users from the mutual user set are displayed at the top of the list, users from the external user set are displayed in the middle of the list, and users from the online user set are displayed at the bottom of the list. The first user 114a may also search for users via the search box 604. In one example, the search box 604 enables the first user 114a to search the users included in the user list 602; however, in other examples, the search box 604 may enable the user to search all users, such as users and contacts not included in the user list 602. The share bar 606 allows the first user 114a to generate a link to the audio room 104 and to share the audio room link via other external platforms (e.g., social media platforms).

Figure 6B:
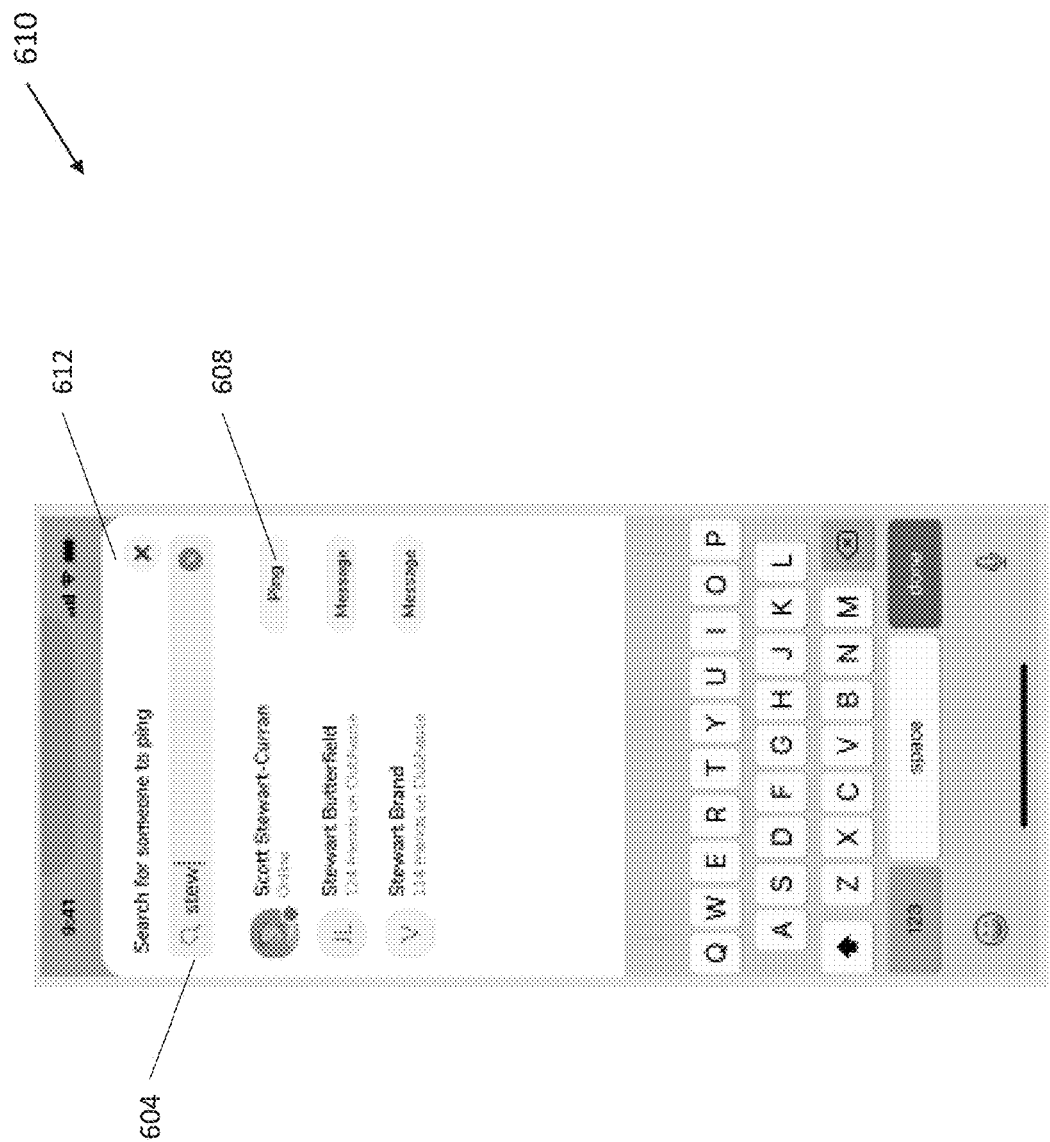

At step 510, the client application 118a receives at least one user that the first user 114a has selected to ping. As described above, the first user 114a can browse users to ping by scrolling through the user list 602 or searching for users via the search box 604. In some examples, a separate search tab is displayed to the first user 114a when using the search function. For example, FIG. 6B illustrates an example view 610 of the user interface 120a including a search tab 612. As shown, the first user 114a may search for users via the search box 604 and results may appear below in real-time as the user is typing. A corresponding ping button 608 is displayed next to each user that appears in the search results.

In one example, the first user 114a can select users to ping by selecting (or tapping) the ping button 608 next to each user. In some examples, the ping button 608 may have a specific configuration depending on the type of user (e.g., platform user, external contact, etc.). For example, for users that have user accounts on the platform, the ping button 608 may default to display "Ping" and may change to display a check mark when selected. Likewise, for external users that do not have user accounts on the platform, the ping button 608 may default to display "Message."

Figure 6C:
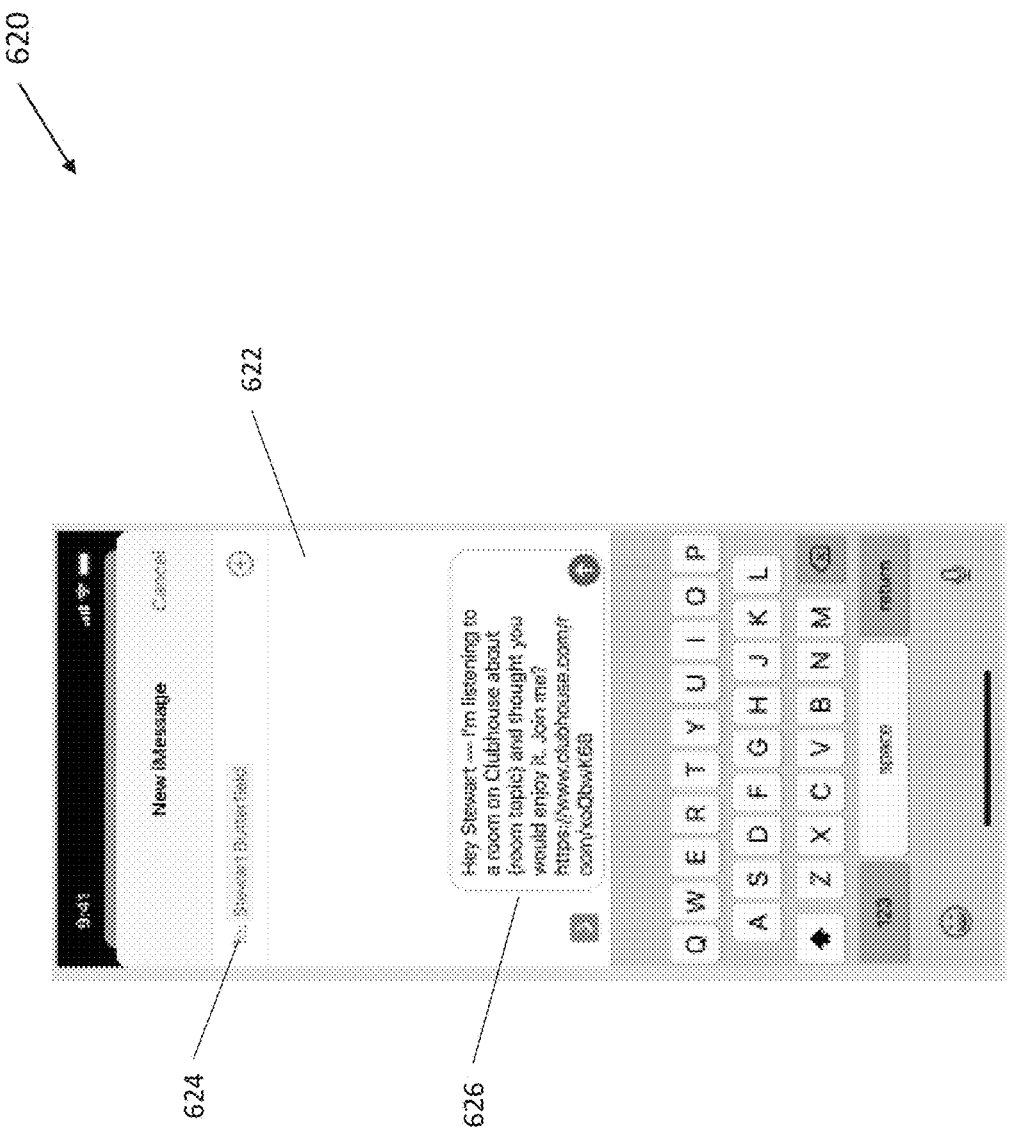

In some examples, when a ping button 608 displaying "Message" is selected, a separate messaging tab is displayed to the first user 114a. For example, FIG. 6C illustrates an example view 620 of the user interface 120a including a messaging tab 622. As shown, the messaging tab 622 includes contact information 624 and a message 626 corresponding to the selected user. For example, the contact information 624 includes a phone number (or email) of the selected user and the message 626 is personalized for the selected user (e.g., "Hey Stewart"). The contact information 624 and the message 626 may be auto-generated (or auto-filled) by the client application 118a. The message 626 can include a description of the audio room 104 (e.g., room title) and a link to join the audio room 104. In certain examples, the link to join the audio room 104 is a web link that directs the selected user to the audio room 104. In some examples, the link may automatically open the client application 118 on a device of the selected user or direct the selected user to an application store to download the client application 118. As such, the messaging tab 622 allows the first user 114 to ping external users to join the audio room 104 without leaving the client application 118a. In some examples, when pinging multiple external contacts, a group message can be sent to the external contacts in a group message thread. In certain examples, the messaging tab 622 is configured to leverage features and/or functionality from a native messaging application installed on the client device 116a (e.g., Apple iMessage).

At step 512, the room engine 106 of the application server 102 is configured to receive the user(s) selected by the first user 114a to ping. In one example, the room engine 106 only receives the selected users who have accounts on the platform, as the external users are "pinged" via the messaging function (e.g., messaging tab 622) of the client application 118a. In some examples, the room engine 106 is configured to send an audio room invite (or notification) to the selected users to join the audio room 104. For example, the room engine 106 may send an invite to the second user 114b.

At step 514, the client application 118b corresponding to the second user 114b is configured to receive the audio room invite from the room engine 106. In one example, the client application 118b can display the invite as a notification with the user interface 120b (e.g., a pop-up notification). In other examples, the client application 118b can provide the invite as a message in a messaging function of the user interface 120b. As described above, some users (e.g., external users) may receive an audio room invite as a text message (or email) outside of the client application 118.

Figure 6D:
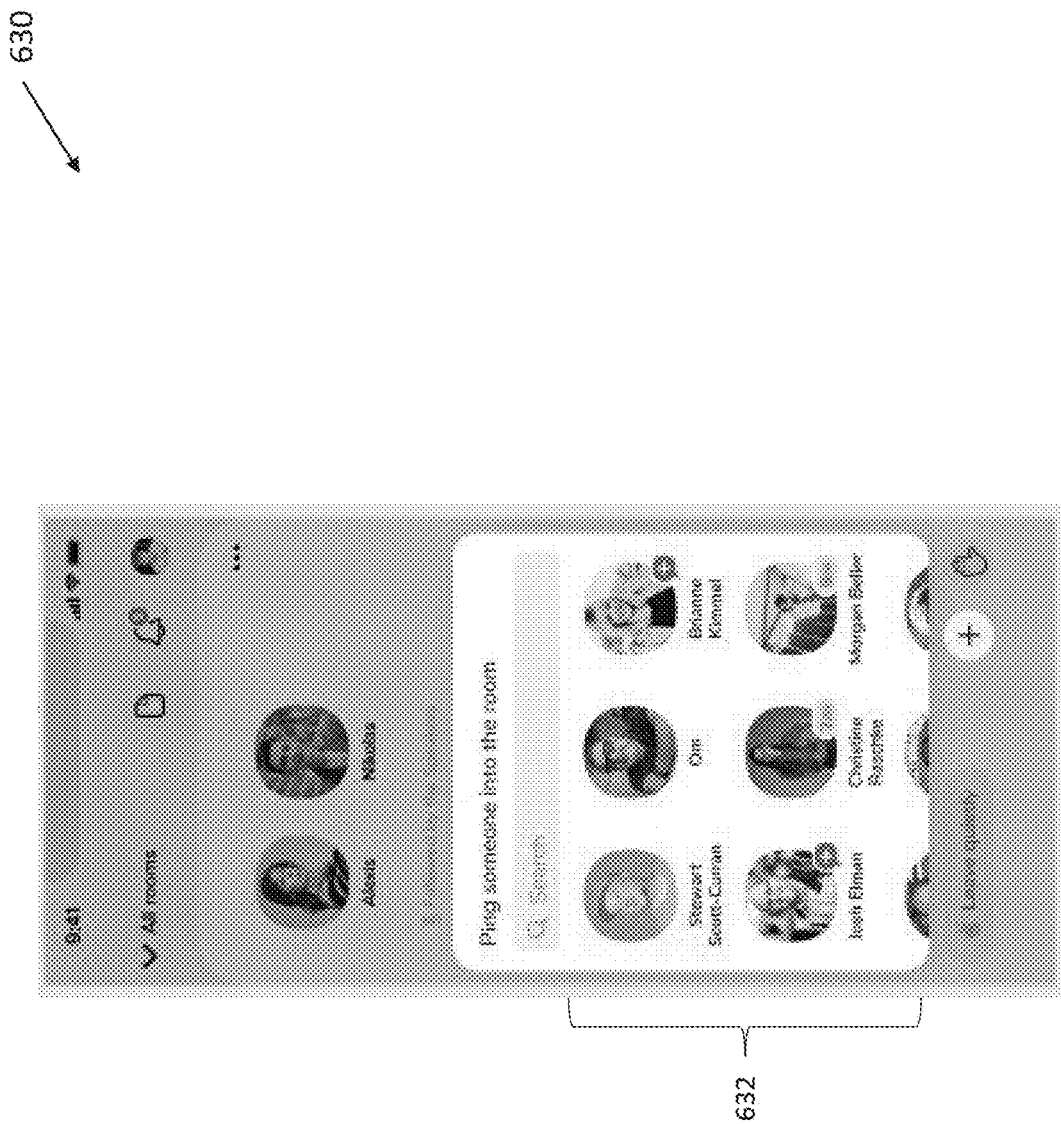

While the above example describes users being displayed in a list (e.g., user list 602), in other examples the users can be displayed differently. For example, FIG. 6D illustrates an example view 630 of the user interface 120. In one example, the view 630 is substantially similar to the view 600 of FIG. 6A, except the view 630 includes users displayed in a user grid 632. In some examples, the users in the user grid 632 can be displayed in a specific order (similar to the user list 602). For example, the users in the user grid 632 can be displayed based on the ordered master user list received from the application server 102.

Starting Audio Rooms from Chat Threads

Figure 7:
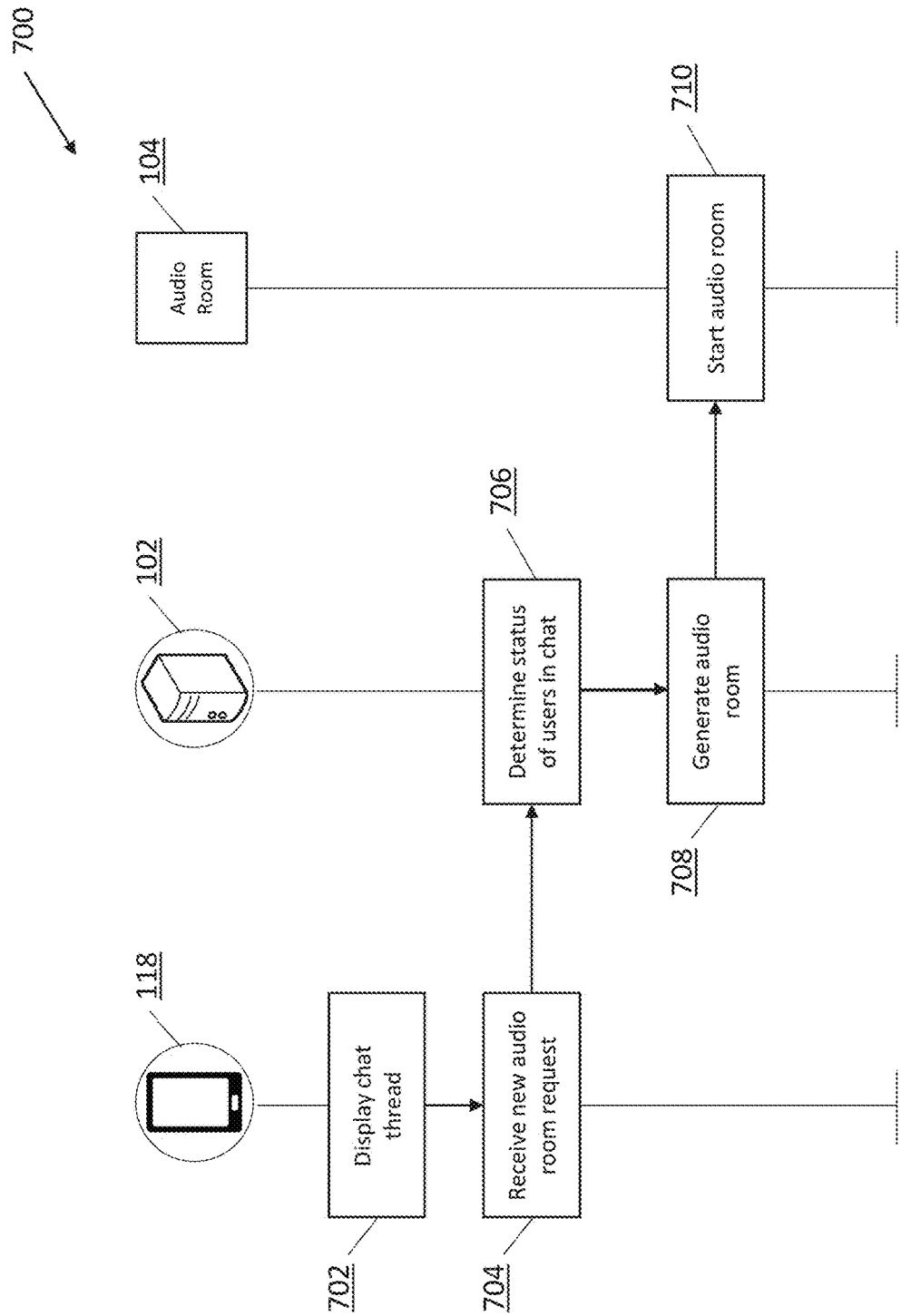
FIG. 7 illustrates a flow diagram of a method for starting an audio room from a chat thread in accordance with aspects described herein.

FIG. 7 is a flow diagram of a method 700 for starting an audio room from a chat thread in accordance with aspects described herein. In one example, the method 500 corresponds to a process carried out by the application server 102 and the client application 118. In various embodiments, the chat thread can be any known or future chat thread system, e.g., those made available by third party platforms such as, as a few examples, a Twitter direct message ("DM") thread, a Facebook Messenger message, a Slack message, etc.

At step 702, the client application 118 is configured to display a chat thread to the user 114. The chat thread corresponds to a text-based conversation between two or more users. In some examples, the chat thread can include picture, images, and videos. In one example, the chat thread is part of a messaging function provided by the message engine 107 of the application server 102 and the user interface 120 of the client application 118 that allows users to communicate outside of audio rooms.

Figure 8A:
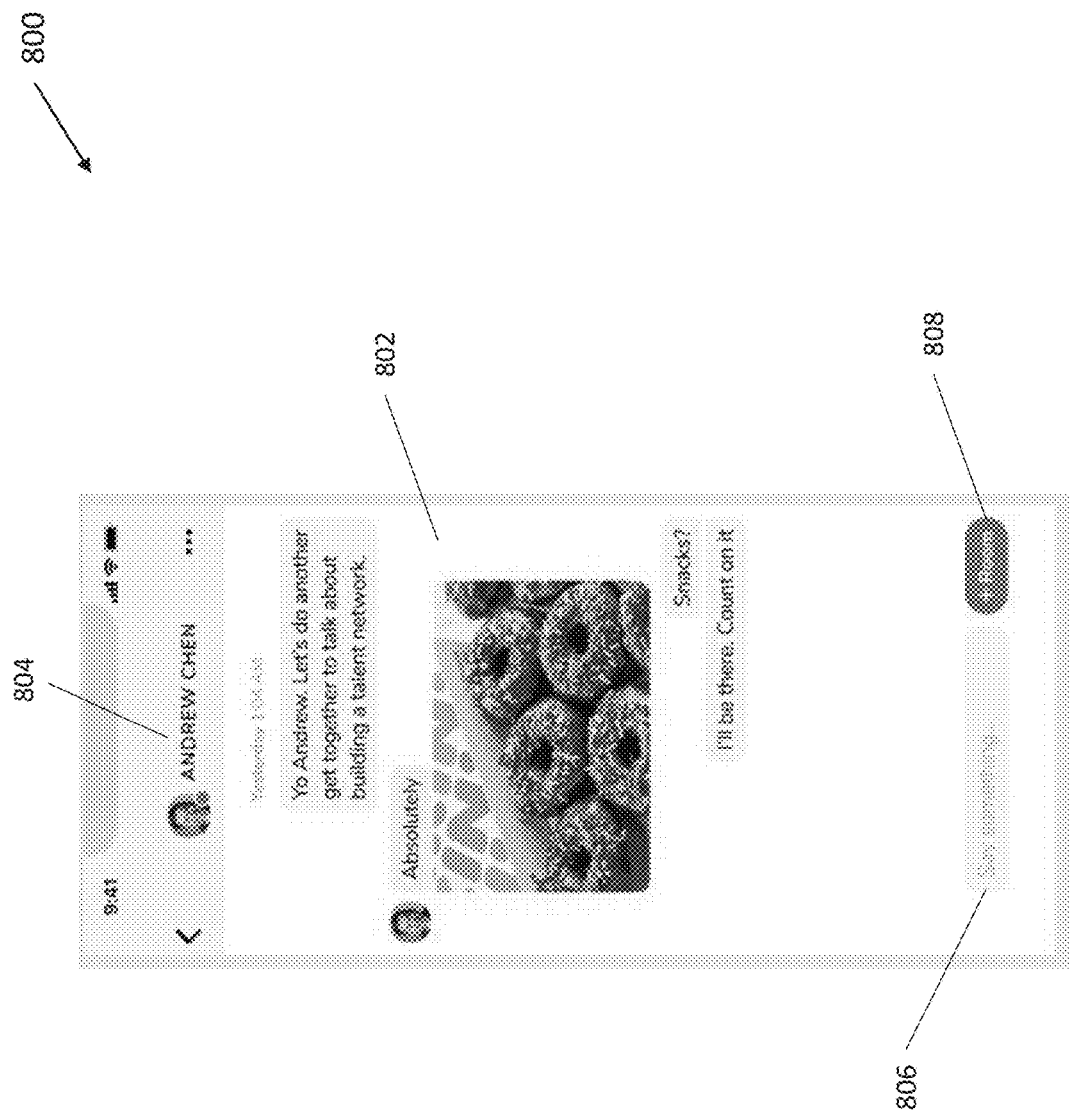
FIGS. 8A-8B illustrate a user interface of a client application in accordance with aspects described herein.

FIG. 8A is an example view 800 of the user interface 120. In one example, the view 800 corresponds to a chat thread 802 from the perspective of the user 114. As shown, the user interface 120 is configured to display a user name 804, a message entry box 806, and an audio room button 808. In one example, the user name 804 corresponds to the user that the user 114 is conversing with. The message entry box 806 is provided for the user 114 to enter messages in the chat thread 802.

At step 704, the client application 118 receives a request to start a new audio room 104 from the chat thread 802. The user 114 may request a new audio room by selecting (e.g., tapping) the audio room button 808 within the chat thread 802. In one example, the audio room button 808 corresponds to the new room function 220 of FIG. 2.

At step 706, the user engine 109 of the application server 102 is configured to determine a status of the users in the chat thread 802. For example, the user engine 109 may check if each user is currently online (or actively using the platform). If at least one user is offline (or inactive), the room engine 106 may send a notification or alert to the offline user(s) that an audio room has been requested. In certain examples, the room engine 106 may wait until each user is online before generating the audio room 104.

At step 708, the room engine 106 of the application server 102 is configured to generate the audio room 104. In one example, the room engine 106 is configured to generate an audio room instance based on parameters of the chat thread 802. For example, the audio room 104 may have a room title 122 corresponding to the names of the user in the chat thread (e.g., "Chat between John and Mike"). In some examples, the audio room 104 is generated as a private (or closed) room including only the members of the chat thread 802. Likewise, each member of the chat thread 802 can be added to the audio room 104 as a speaker. In some examples, the room engine 106 sends notifications to the users who are being invited to the join the audio room 104 as speakers.

At step 710, the application server 102 starts the audio room 104. In one example, the room engine 106 is configured to start the audio room 104 by launching the generated audio room instance on the application server 102 (or a different server). In some examples, once started, the audio room 104 may become visible to all users included in the chat tread 802. For example, the title 122 of the audio room 104 may become visible to each user via the calendar function 214 (shown in FIG. 2). As such, each member of the chat thread 802 may discover and join the audio room 104. Once started, the audio room 104 can be opened up by the user 114 (or another chat member) and made visible to friends of the user 114 (or other chat members).

Figure 8B:
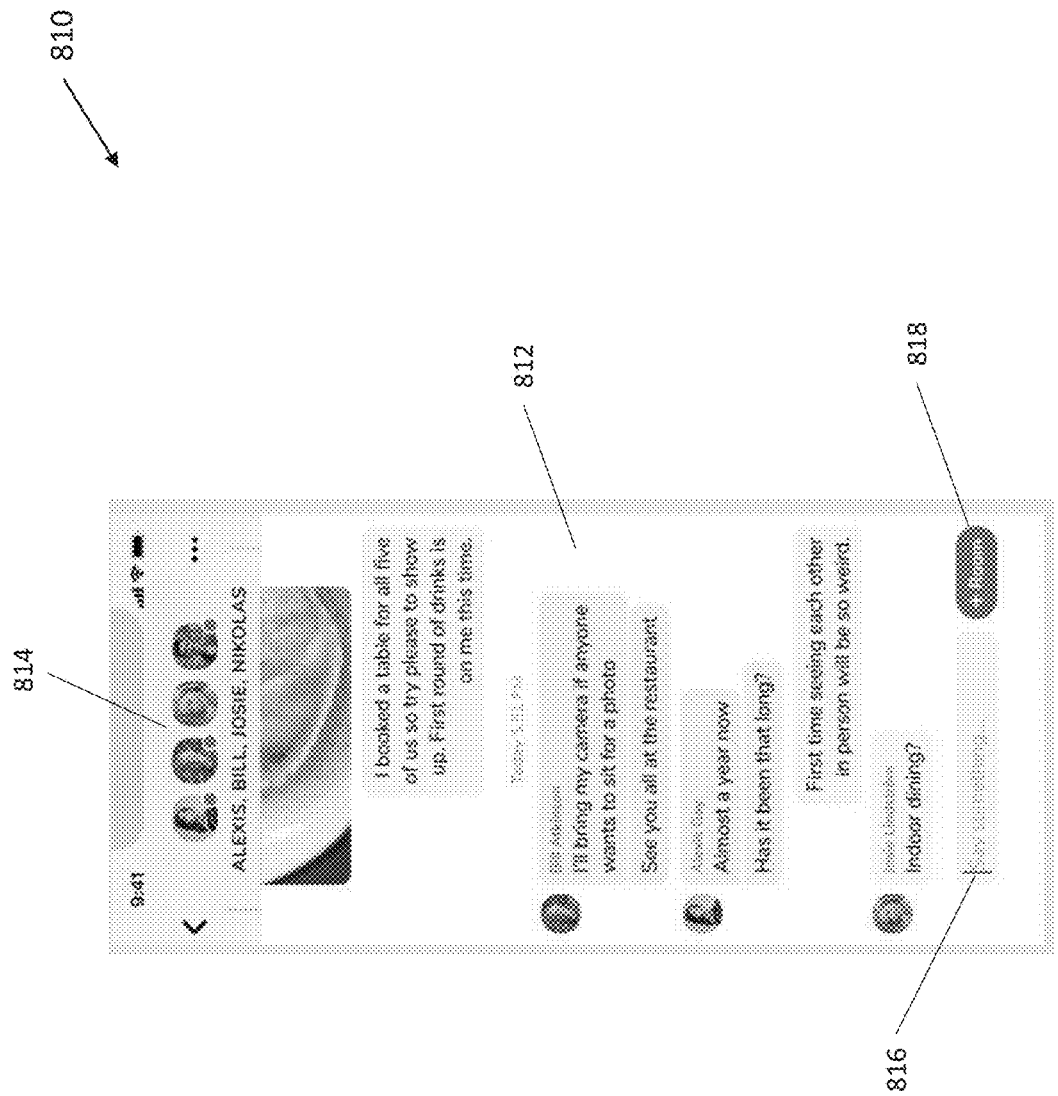

While the example above describes a chat between two users, it should be appreciated that an audio room can be started from a group chat thread (e.g., group message). FIG. 8B is an example view 810 of the user interface 120. In one example, the view 810 corresponds to a group chat thread 812 from the perspective of the user 114. As shown, the user interface 120 is configured to display the user names 814, a message entry box 816, and an audio room button 818. In one example, the user names 804 correspond to each user that the user 114 is conversing with (e.g., each member of the group chat). In some examples, the user names 804 may be displayed as a group name (e.g., club name) rather than the individual names of each user. The message entry box 816 is provided for the user 114 to enter messages in the group chat thread 812. The user 114 may request a new audio room by selecting (e.g., tapping) the audio room button 818 within the chat thread 812. In one example, each member of the group chat thread 812 can be added to the audio room 104 as a speaker; however, in some examples, at least a portion of the group chat members can be added to the audio room as audience members. In certain examples, the room engine 106 sends notifications to the members of the group chat who are being invited to the join the audio room 104. In some examples, the user 114 can request to start an audio room 104 with only a portion of the members of the groups chat thread 812 (e.g., one other member, two other members, etc.).

Waving at Users to Start Audio Rooms

Figure 9:
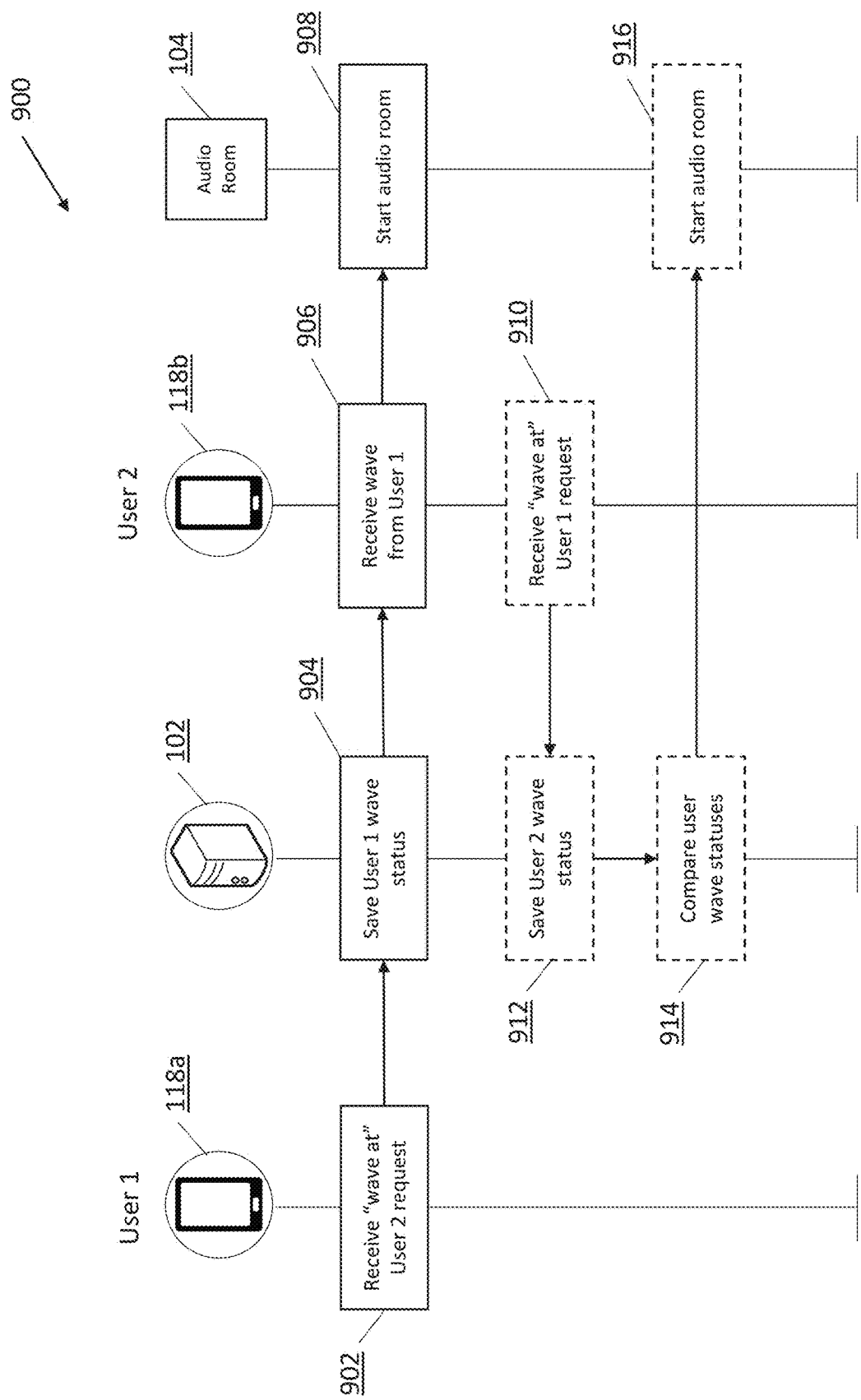
FIG. 9 illustrates a flow diagram of a method for waving at users to start an audio room in accordance with aspects described herein.

FIG. 9 is a flow diagram of a method 900 for waving at users to start an audio room in accordance with aspects described herein. In this context, a first user can "wave at" a second user to indicate that they are interested in talking with the second user in an audio room. In one example, the method 500 corresponds to a process carried out by the application server 102 and the client application 118.

Figure 10A:
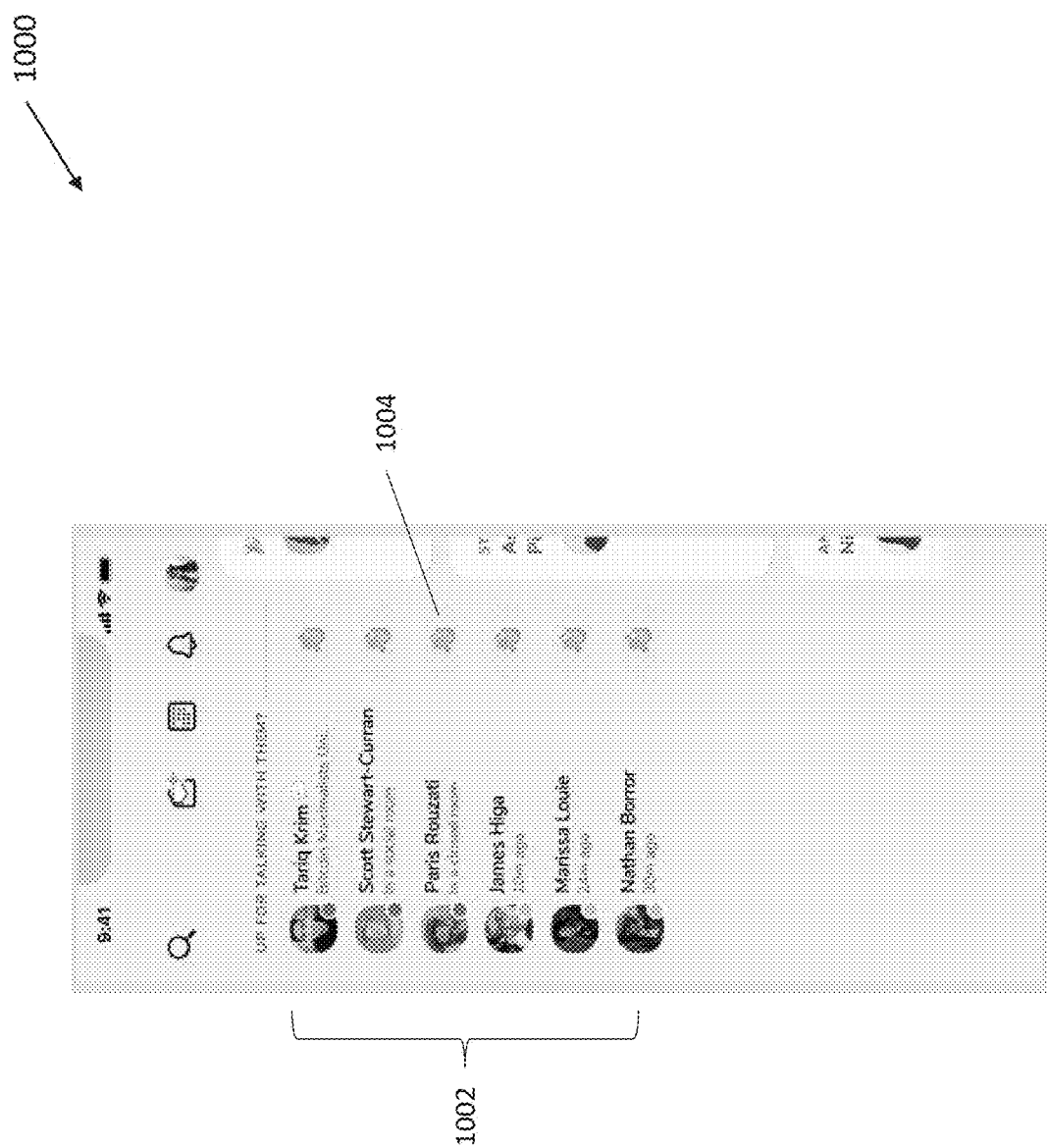
FIGS. 10A-10J illustrate a user interface of a client application in accordance with aspects described herein.

At step 902, the client application 118a receives a "wave at" request from the first user 114a. In one example, the first user 114a may "wave at" one or more users via the user interface 120a of the client application 118a. For example, FIG. 10A illustrates an example view 1000 of the user interface 120a. In one example, the first user 114a can navigate to the view 1000 by swiping in a specific direction (e.g., left) on the home screen of the user interface 120a (e.g., view 200 of FIG. 2). As shown, a user list 1002 is displayed to the first user 114a. In one example, the user list 1002 includes users who follow the first user 114a. In some examples, the users included in the user list 1002 correspond to the first user's friends (or co-follows) who are currently online. In other examples, the users included in the user list 1002 may correspond to a different group of users, such as the various user sets described above (e.g., User Set A, User Set B, etc.).

Figure 10B:
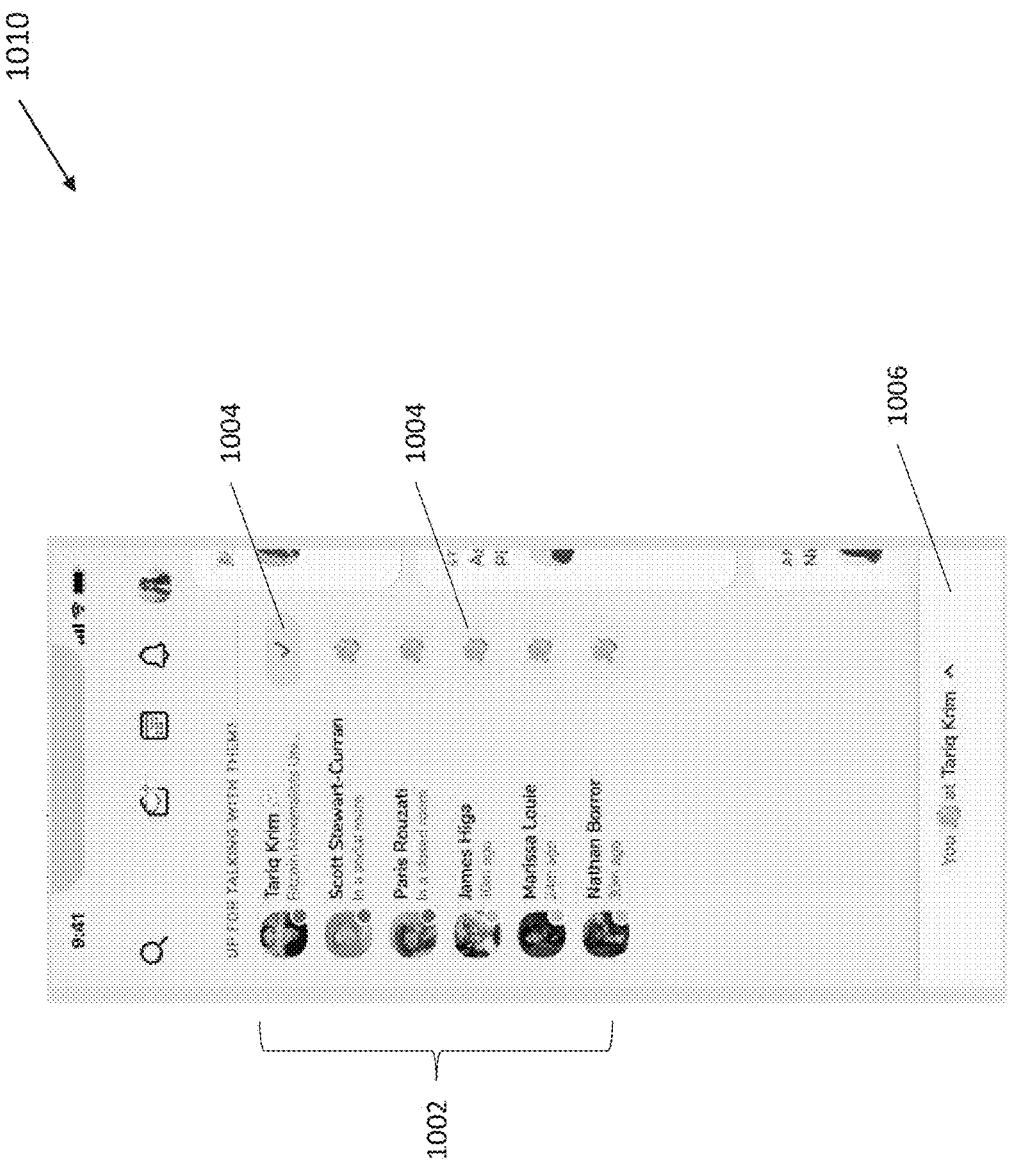

In one example, each user in the user list 1002 has a corresponding wave button 1004. The first user 114a may request to "wave at" or more users by selecting (e.g., tapping) the wave button 1004 next to the user(s) in the user list 1002. For example, FIG. 10B illustrates an example view 1010 of the user interface 120a. As shown, the wave button 608 may default to display a hand wave icon and can change to display a check mark when selected. The selected user(s) can be added to a wave bar 1006 indicating that the first user 114a has waved at another user (e.g., the second user 114b).

Figure 10C:
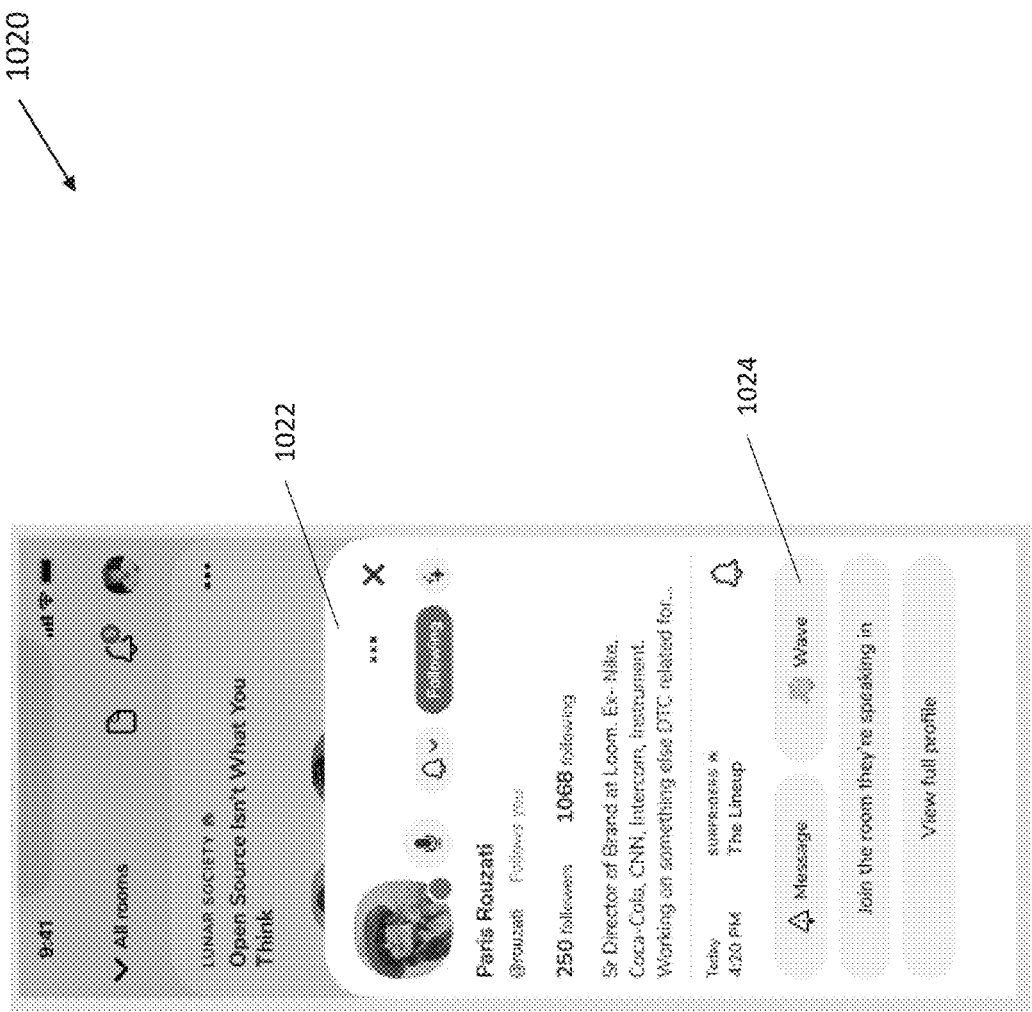

In some examples, the first user 114a can request to "wave at" at users who follow them via the user's profile. FIG. 10C illustrates an example view 1020 of the user interface 120a including a user profile tab 1022. In one example, the user profile tab 1022 is displayed when the first user 114a selects another user within the user interface 120a (e.g., from the home screen, in a chat thread, etc.). Likewise, the user profile tab 1022 may be displayed to the first user 114a when searching users via the explore function 212 (shown in FIG. 2). As shown, the user profile tab 1022 includes a wave button 1024. The first user 114a may request to "wave at" the user by selecting (e.g., tapping) the wave button 1024. In some examples, once "waved at," the user is added to the wave bar 1006 displayed to the first user 114a.

At step 904, the application server 102 is configured to receive the user(s) "waved at" by the first user 114a. In one example, the user engine 109 of the application server 102 is configured to save a wave status of the first user 114a corresponding to the user(s) selected by the first user 114a to "wave at" (e.g., the second user 114b). In some examples, the user engine 109 can save the wave status of the first user 114a in the user database 112b. In certain examples, the user engine 109 is configured to send a wave notification (or alert) to the selected users on behalf of the first user 114a. For example, the user engine 109 may send a wave notification to the second user 114b.

At step 906, the client application 118b corresponding to the second user 114b is configured to receive the wave notification from the user engine 109. In one example, the client application 118b can display the notification as an alert within the user interface 120b (e.g., a pop-up alert). For example, the client application 118b may display the notification at the top of the user interface 120 as a banner (e.g., a toast). In other examples, the client application 118b can provide the wave notification as a message in a messaging function of the user interface 120b. In some examples, the second user 114b can accept the wave notification (e.g., "wave back") to start an audio room 104.

At step 908, in response to the second user 114b accepting the wave notification from the first user 114a, the room engine 106 is configured to generate an audio room 104. In one example, the room engine 106 is configured to generate an audio room instance corresponding to the first user 114a and the second user 114b. For example, the audio room 104 may have a room title 122 corresponding to the names of the users 114a, 114b (e.g., "Chat between John and Mike"). In some examples, the audio room 104 is generated as a private (or closed) room including only the first and second users 114a, 114b. Likewise, each user 114a, 144b can be added to the audio room 104 as a speaker. The room engine 106 may start the audio room 104 by launching the generated audio room instance on the application server 102 (or a different server). Once started, the audio room 104 may be opened up by the first user 114a (or the second user 114b) and made visible to friends of the first user 114a and/or the second user 114b.

In one example, room invites can be sent to users that the first user 114a or the second user 114b "waved at" before joining the audio room 104. For example, if the first user 114a waved at ten users (including the second user 114b), then the remaining nine "waved at" users may receive invites to join the audio room 104. The users who receive room invites may join the audio room 104 as speakers, audience members, or as a combination of both at the discretion of the first user 114a and/or the second user 114b. In some examples, the room invites may remain active as long as the audio room 104 is active (e.g., open); however, in other examples, the room invites may expire after a predetermined amount of time (e.g., ten minutes). In certain examples, the room invites may expire after a conditional event. For example, if the first user 114a leaves the audio room 104, the room invites sent to the users who were waved at by the first user 114a may expire (or be rescinded). The first user 114a and/or the second user 114b may rescind the room invites sent to the other "waved at" users at any time via the client application 118.

In some examples, if the wave notification is not acknowledged (or accepted) by the second user 114a, the first user 114a may continue to use the client application 118a as normal. In certain examples, the room engine 106 may save the wave status of the first user 114a (step 904) without sending a wave notification to the second user 114b to launch an audio room (steps 906, 908). In such examples, after waving at the second user 114b, the first user 114a may continue to use the client application 118a as normal.

Figure 10D:
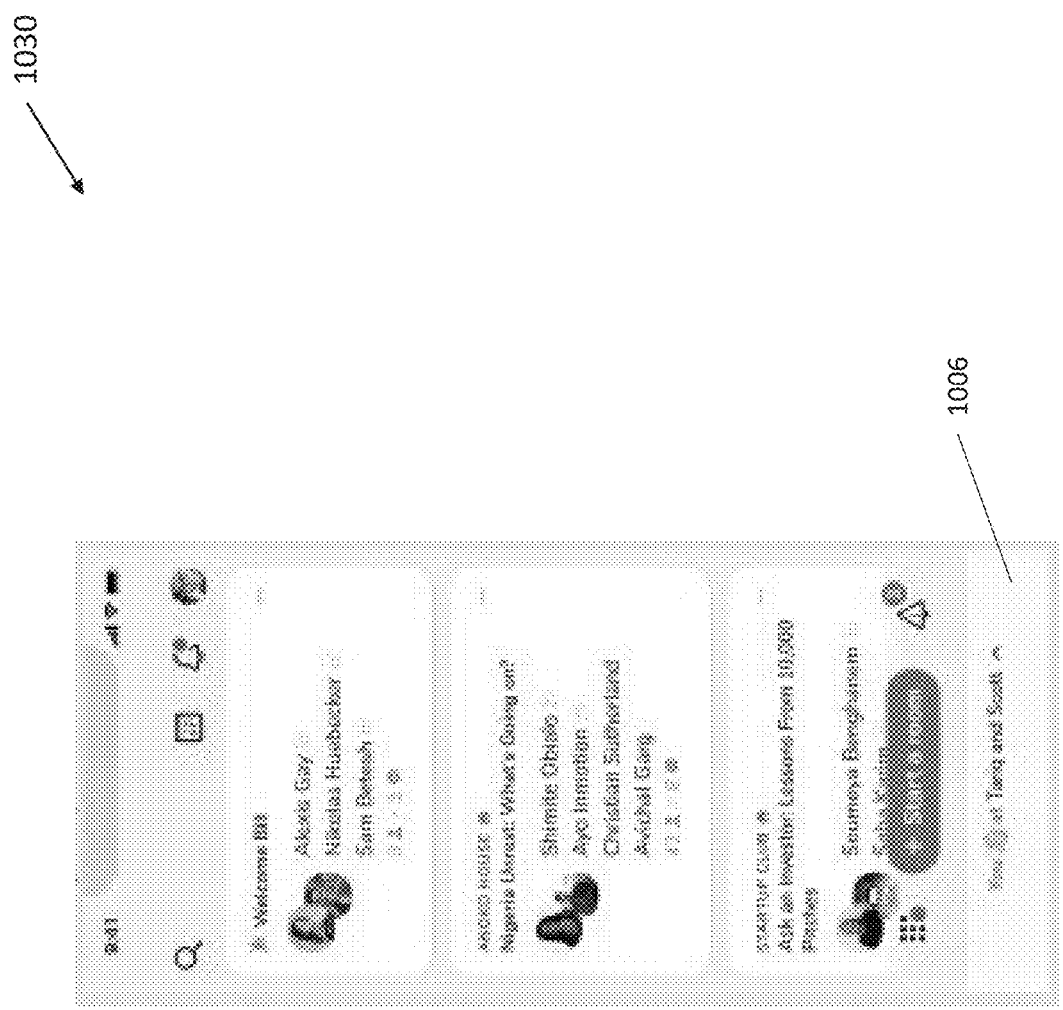
Figure 10E:
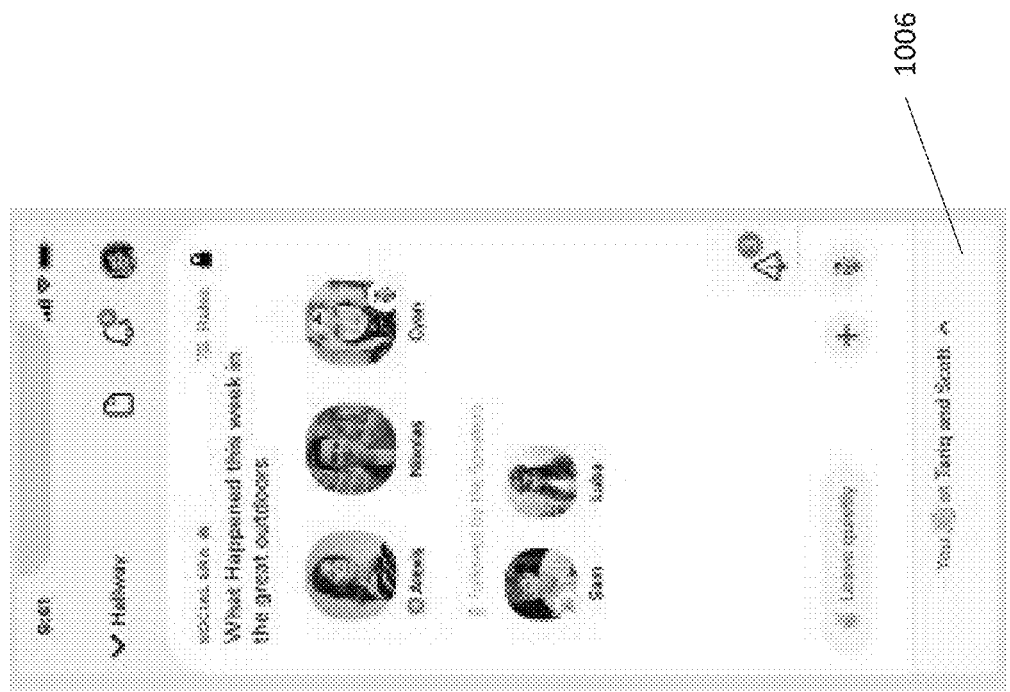
Figure 10F:
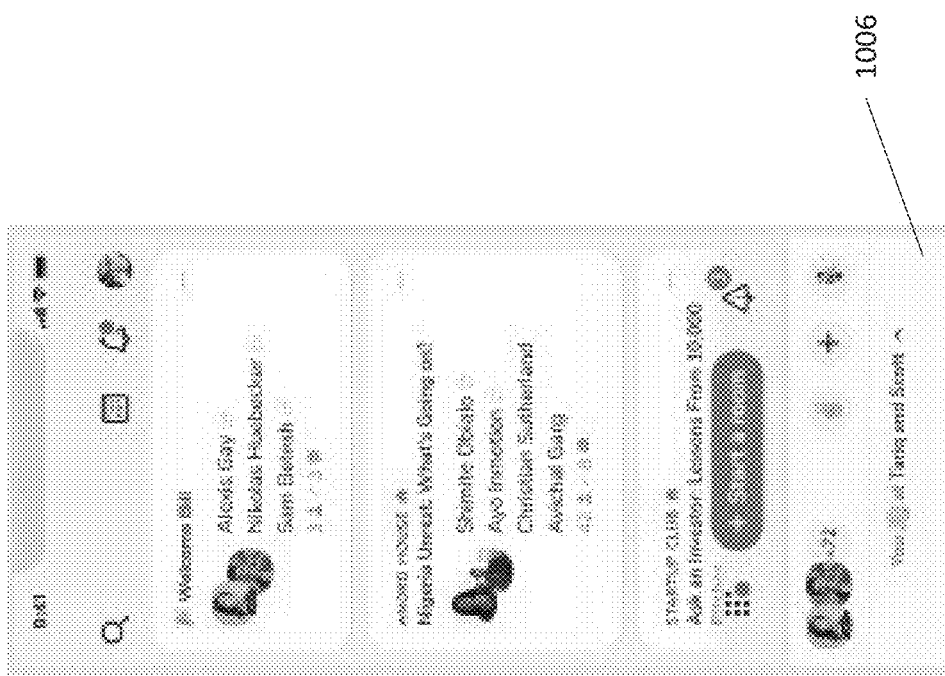
Figure 10G:
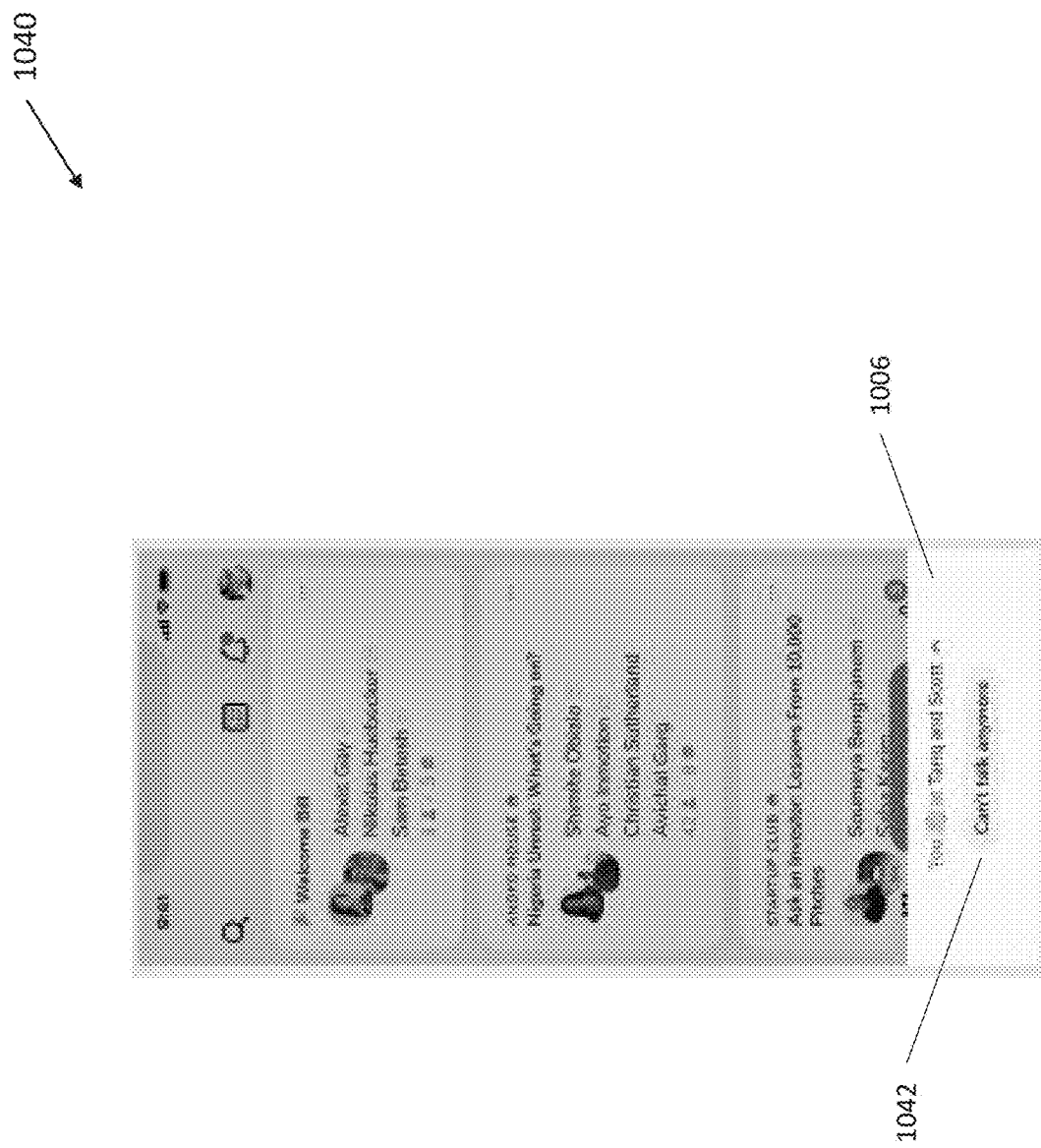

FIG. 10D illustrates an example view 1030 of the user interface 120a including a wave bar 1006. In one example, the view 1030 corresponds to the home screen of the user interface 120a including the wave bar 1006. The first user 114a can continue to use the platform (e.g., browse audio rooms, search users, etc.) while maintaining active waves in the wave bar 1006. In some examples, the first user 114a can join an audio room as an audience member while maintaining active waves in the wave bar 1006 (see FIG. 10E). Likewise, the first user 114a may return to the home screen while remaining in the audio room and maintaining active waves in the wave bar 1006 (see FIG. 10F). At any point, the first user 114a may dismiss (or cancel) their active waves. For example, FIG. 10G illustrates an example view 1040 of the user interface 120a including the wave bar 1006. As shown, the first user 114a may select (or tap) on the wave bar 1006 to display a "Can't talk anymore" button 1042. The user 114a can select (or tap) the button 1042 to dismiss (or cancel) any active waves previously selected. In some examples, in response to the first user 114a dismissing (or canceling) any active waves, the client application 118a can send a request to the user engine 109 of the application server 102 to clear (or update) the wave status of the first user 114a in the user database 112b. In some examples, the first user 114a can continue to use the platform as normal until a wave match is found.

At step 910, the client application 118b receives a "wave at" request from the second user 114b. In one example, the first user 114a can "wave at" one or more users via the user interface 120b of the client application 118b. For example, the second user 114b may wave at the first user 114a.

At step 912, the application server 102 is configured to receive the user(s) "waved at" by the second user 114b. In one example, the user engine 109 of the application server 102 is configured to save a wave status of the second user 114b corresponding to the user(s) selected by the second user 114b to "wave at" (e.g., the first user 114a). In some examples, the user engine 109 can save the wave status of the second user 114b in the user database 112b.

At step 914, the user engine 109 is configured to check the wave status of the second user 114b for a wave match. In one example, the user engine 109 can check the wave status of the second user 114b by comparing the wave status of the second user 114b to the wave statuses of other users (e.g., the first user 114a). The user engine 109 may find a wave match when the wave statuses indicate that two or more users have waved at each other (e.g., the first and second users 114a. 114b).

At step 916, in response to finding a wave match between the first user 114a and the second user 114b, the room engine 106 is configured to generate and start an audio room 104. In one example, the room engine 106 is configured to generate an audio room instance corresponding to the first user 114a and the second user 114b. For example, the audio room 104 may have a room title 122 corresponding to the names of the users 114a, 114b (e.g., "Chat between John and Mike"). In some examples, the audio room 104 is generated as a private (or closed) room including only the first and second users 114a, 114b. Likewise, each user 114a. 144b can be added to the audio room 104 as a speaker. The room engine 106 may start the audio room 104 by launching the generated audio room instance on the application server 102 (or a different server). Once started, the audio room 104 may be opened up by the first user 114a (or the second user 114b) and made visible to friends of the first user 114a and/or the second user 114b. In some examples, room invites can be sent to other "waved at" users, as described above.

While the above example describes an audio room corresponding to a wave match between two users (e.g., the first and second users 114a, 144b), in other examples, audio rooms can be created based on a wave match between three or more users. For example, when checking the wave status of each user, the room engine 106 may find three or more users who have waved at each other. As such, the room engine can generate an audio room for the three or more users.

As described above, the user 114 can cancel active waves by selecting (or tapping) a button in the user interface 120 (e.g., the button 1042 of FIG. 10G). In some examples, the active waves of a user can be suspended or canceled automatically. For example, the active waves of a user may be suspended when the user 114 is not in an audio room and exits the client application 118 (without closing the client application 118). In other words, the active waves may be suspended when the client application 118 is running in the background of the user device 116. Likewise, the active waves can be suspended when the user 114 joins a stage in an audio room (i.e., becomes a speaker). As such, the waves can be unsuspended when the user 114 reopens the client application 118 or leaves the stage of the audio room. In some examples, the suspended waves may be automatically canceled (or dismissed) after being suspended for a defined period of time (e.g., 10 minutes). It should be appreciated that wave matching features of steps 910-916 may be optional features of the system 100.

Figure 10H:
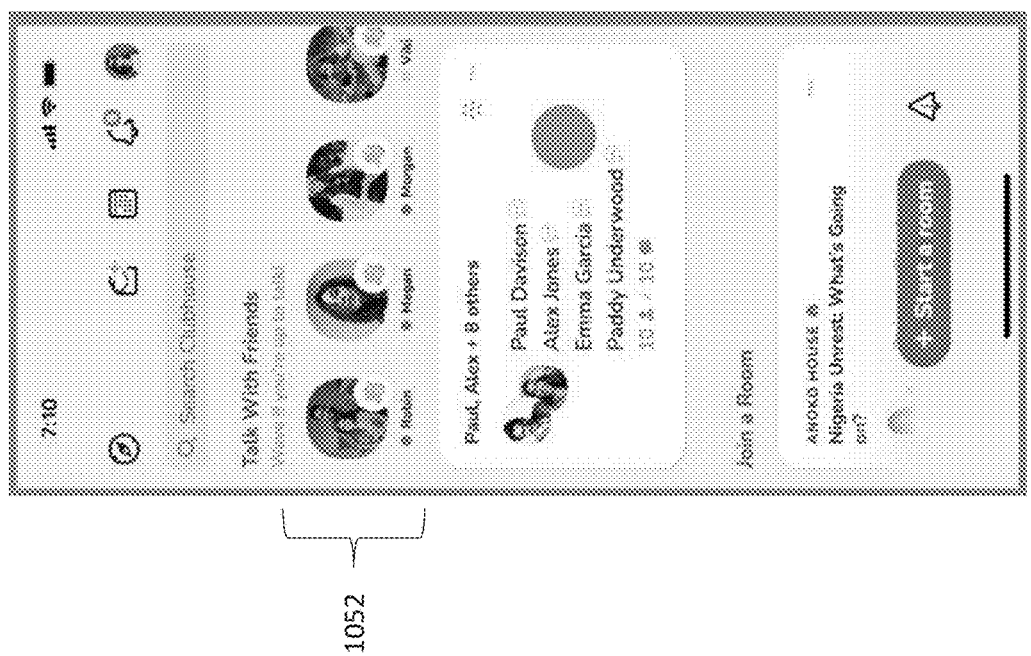
Figure 10I:
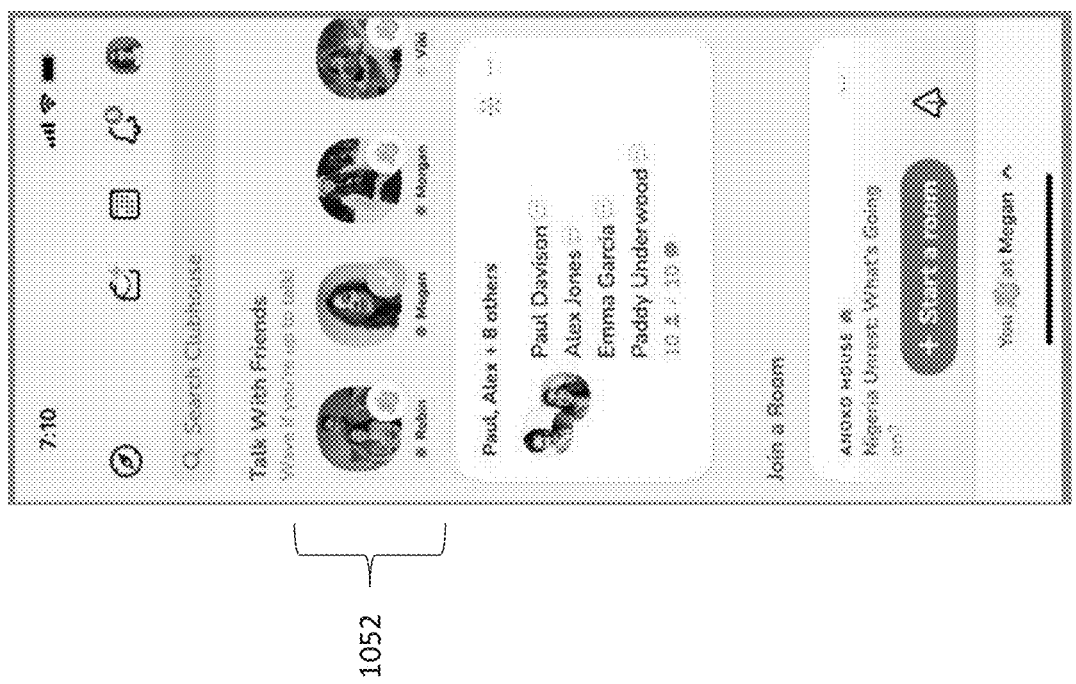
Figure 10J:
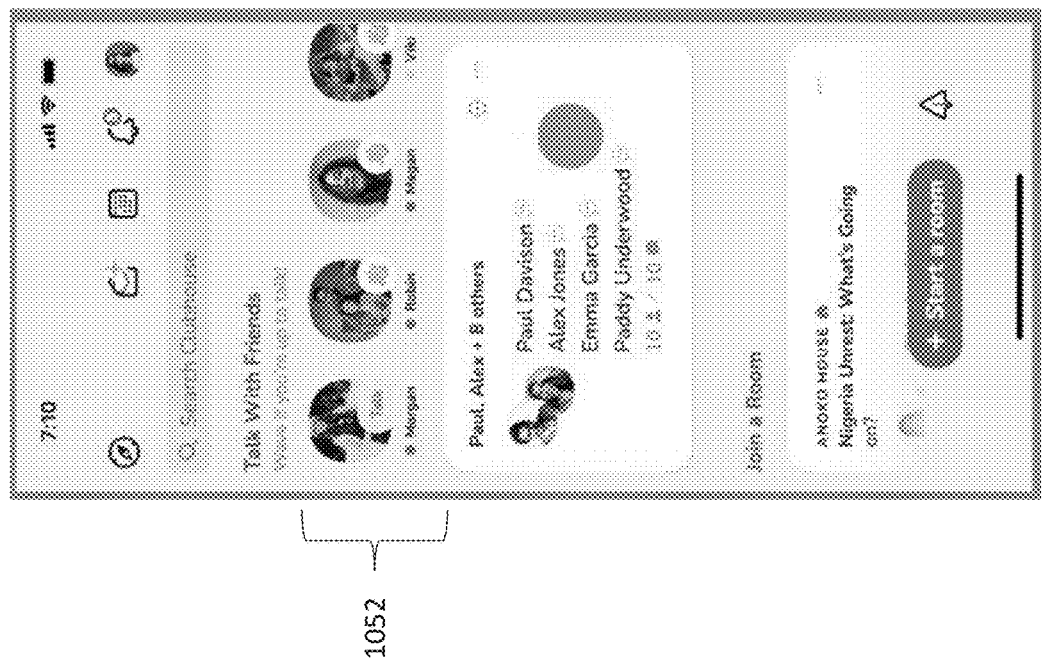

In some examples, one or more users (e.g., friends or co-follows) are presented to the user 114 as potential wave candidates. For example, FIG. 10H illustrates an example view 1050 of the user interface 120. In one example, a wave bar 1052 is displayed to the user 114. In some examples, the wave bar 1052 includes users who follow the user 114. In some examples, the users included in the wave bar 1052 correspond to the user's friends (or co-follows) who are currently online. As shown in FIG. 10I, each user included in the wave bar 1052 has a wave button. Each wave button may default to display a hand wave icon and can change to display a check mark when selected. In some examples, the user 114 can select (or "wave at") any number of users displayed in the wave bar 1052. Likewise, as shown in FIG. 10J, each wave button may display a "Talk" icon when a wave match occurs. In some examples, the user 114 can select the "Talk" icon to open a new audio room 104 with the corresponding user (or users). The audio room 104 may include all users who have "wave matched" with the user 114. In other examples, the user 114 may select which "wave matched" users are invited to the audio room 104. In some examples, the room engine 106 is configured to automatically generate and start the audio room 104 based on the occurrence of at least one "wave match."

In one example, the wave bar 1052 includes users that are selected and/or arranged based on a scoring criteria. For example, a unique score may be generated for each friend (or co-follower) of the user 114. In other examples, a unique score may be generated for a subset of the user's friends (e.g., friends who the user 114 has recently interacted with). The score may provide an indication (e.g., strength, compatibility, etc.) of the relationship between the user 114 and each friend. In one example, the score is based on parameters associated with actions between the user 114 and the friend. For example, these parameters may include: the number of common rooms joined by the user 114 and the friend, the number of rooms joined by the user 114 or the friend that were hosted by the user 114 or the friend, the number of overlapping contacts (or friends) between the user 114 and the friend, room invites sent by the user 114 to the friend (or vice versa), room invites accepted by the user 114 from the friend (or vice versa), rooms shared by the user 114 that are associated with the friend (e.g., hosted by the friend), rooms shared by the friend that are associated with the user 114 (e.g., hosted by the user 114), common clubs joined by both the user 114 and the friend, a quantity or frequency of direct messages (DMs) sent between the user 114 and the friend, a number of waves sent by the user 114 to the friend, a number of waves sent by the friend to the user 114, a number of waves accepted by the user 114 from the friend, and a number of waves accepted by the friend from the user 114.

In some examples, the score calculation corresponds to a weighted combination (e.g., summation) of two or more of the parameters listed above. In one example, higher priority parameters may have a higher (or larger) weighting to bias the score calculation in a desired manner. For example, the "number of waves accepted" parameter(s) may be assigned a higher weighting than the "room invites sent" parameter(s). In some examples, the parameters are normalized before the score is calculated. The parameters may be normalized relative to a predictive value (e.g., based on user monitoring across the platform) or an average value (e.g., of a plurality of users). In some examples, the parameters are normalized relative to the activity of the user 114 or the friend. By normalizing the parameters, each parameter may reflect an accurate level of the user's current activity (e.g., normal, increased, low, etc.) before the weighted score calculation is performed.

In some examples, the user engine 102 is configured to calculate the unique scores for each friend (or co-follower) of the user 114. The user engine 102 may select the top scores (e.g., top 10, 20, 100, etc.) and provide the corresponding friend list for display in the wave bar 1052. In one example, the users are displayed in the wave bar 1052 based on score (e.g., highest scores first, lowest scores last); however, in other examples, the users may be displayed in a different order (e.g., alphabetical). In some examples, the user engine 102 is configured to update the scores for each friend at a periodic interval (e.g., once a day, every 30 mins, every 30 secs, etc.). In other examples, the user engine 102 can be configured to update the scores for each friend based on one or more events (e.g., opening or closing of the user application 118). The selection of friends to include in the wave bar 1052 (e.g., top 10 scores) may be updated in a similar manner.

In some examples, the unique scores calculated for each friend (or co-follower) of the user 114 are dynamic scores having one or more temporal components. In one example, the weights used for score calculation may vary over time. For example, a weight may have an associated decay rate that reduces the significance of a score parameter over time. Likewise, a weight may have an associated growth rate that increases the significance of a score parameter over time. In some examples, the temporal rates may be linked to one another, such that when one weight value decreases another increases by an equal amount (e.g., to maintain a constant total weight value for score calculation). By including a temporal component to the score calculation process, the scores may be biased to increase the success rate of real-time (or live) interactions. For example, weights with higher orders of variability may be applied to dynamic parameters (e.g., "wave count" parameters) compared to static (or near static) parameters (e.g., "overlapping contacts" parameters).

In some examples, an attention parameter is used to represent a directional aspect of the relationship between the user 114 and each friend. For example, if the user 114 and the friend are equally likely (or somewhat equally likely) to pay attention to each other (e.g., accept waves, accept room invites, etc.), then the relationship is classified as bidirectional. Likewise, if the user 114 is more likely to pay attention to the friend than the friend is likely to pay attention to the user (or vice versa), then the relationship is classified as unidirectional. In some examples, the attention parameter is represented by a value (e.g., 0 to 100). For example, a value of 0 may indicate that the user 114 pays no attention to the friend and a value of 100 may indicate that the user 114 pays full attention to the friend (e.g., accepts every wave, room invite, etc.). In other examples, the attention parameter can be represented by a percentage, grade, or any other suitable indicator.

In one example, the attention parameter is included as a parameter (e.g., weighted or unweighted) in the score calculation. In some examples, the attention parameter may be used as a weight (or used to determine a weight) applied in the score calculation. In some examples, the attention parameter is used to rank, filter, or sort the users (e.g., friends) included in the wave bar 1052. For example, once the top scores are identified (e.g., top 10), the attention parameters may be used to determine the order for displaying the corresponding users in the wave bar 1052. In one example, friends who the user 114 has a bidirectional relationship are displayed first in the wave bar 1052. In other examples, where the attention parameter is a value, the friends may be ordered in the wave bar 1052 from highest to lowest. As such, the use of the attention parameter enables biasing of the wave bar 1052 to increase the success rate of real-time (or live) interactions. For example, friends who the user 114 is most likely to interact with may have higher scores and/or be displayed first in the wave bar 1052.

As described above, the score calculation process may be performed by the user engine 102. In one example, the score calculation process includes the use of one or more score calculation algorithms. In some examples, the score calculation process includes the use of a machine learning model or other predictive tool. In general, any suitable machine learning technique can be used, such as, for example: machine learning technique can be used, such as, for example: a gradient boosted random forest, a regression, a neural network, a decision tree, a support vector machine, a Bayesian network, other type of technique. In some examples, the machine learning model is used to determine the score for each user (e.g., friend of the user 114). In some examples, the machine learning model is used to identify parameters that indicate increased success for achieving real-time (or live) interactions.

Discovering Active Users

Figure 11A:
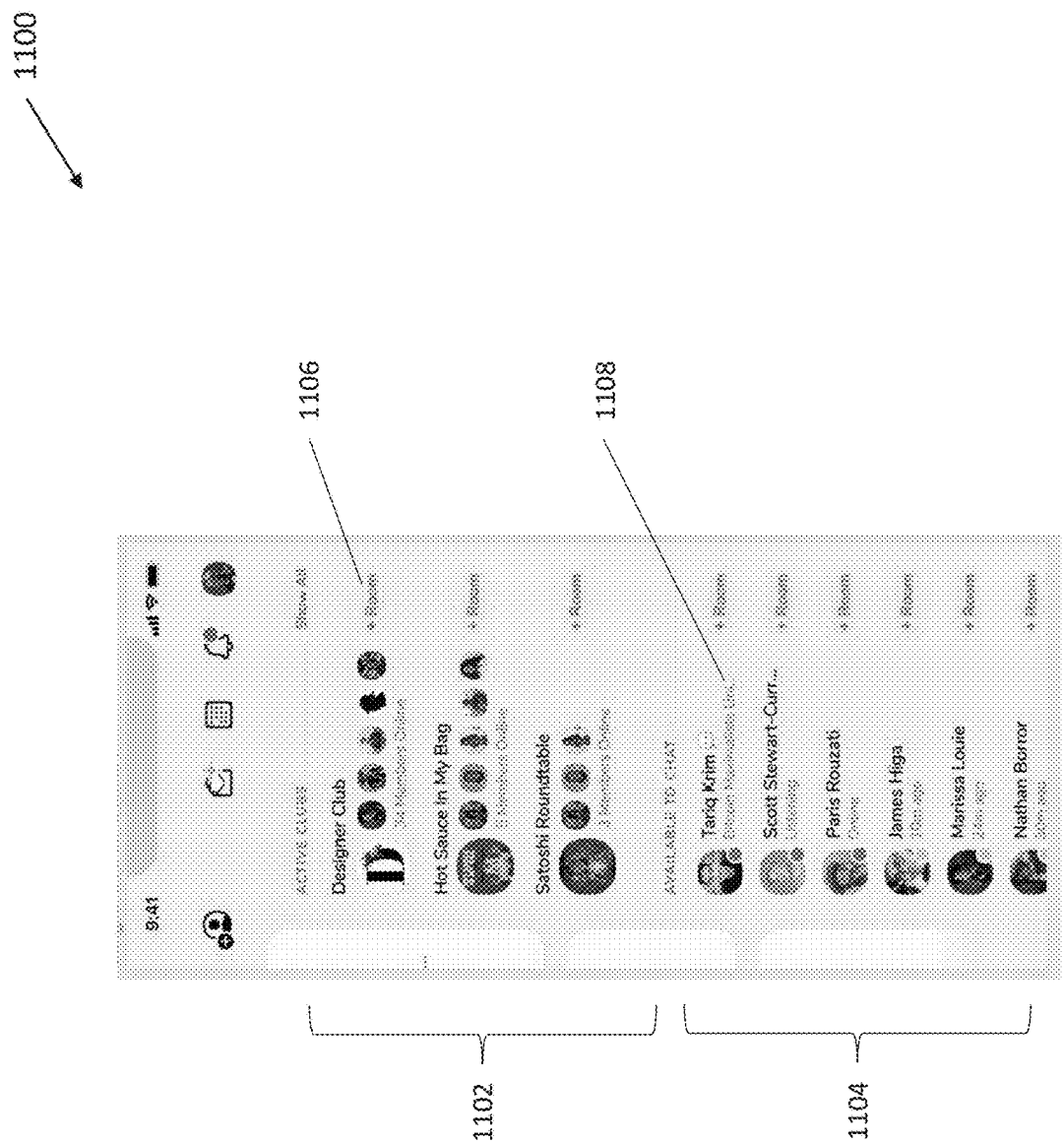
FIGS. 11A-11B illustrate a user interface of a client application in accordance with aspects described herein.

When determining who to speak with, it may be beneficial for users to view a list of users who are actively using the platform (or were recently using the platform). For example, FIG. 11A illustrates an example view 1100 of the user interface 120. In one example, the user 114 can navigate to the view 1100 by swiping in a specific direction (e.g., right) on the home screen of the user interface 120 (e.g., view 200 of FIG. 2). In some examples, the view 1100 corresponds to a "sidebar." The sidebar can be displayed within the same environment and/or executed by the same application as the platform. As shown, an active club list 1102 and an active user list 1104 are displayed to the user 114. In one example, the active club list 1102 includes clubs having at least one active member on the platform. The clubs included in the list 1102 may correspond to clubs that the user 114 is a member of. In some examples, only certain club members may have permission to start audio rooms associated with the club. As such, the clubs included in the list 1102 may only include clubs that the user 114 is allowed to start audio rooms for. The user 114 may select a room button 1106 next to each club to start (or request to start) a live audio room including the active members of each club.

Similarly, the active user list 1104 includes users who are actively using the platform or were recently using the platform. In one example, the user list 1104 includes active users who are in an audio room 104 (e.g., as a speaker or audience member), active users who are browsing the platform, and/or inactive users who were previously on the platform. In general, the list 1104 can be populated with any collection of users; for example, the users included in the list 1104 can correspond to co-followers or friends of the user 114. The inactive users included in the list 1104 may correspond to users who have been inactive for less than a predefined period of time (e.g., 5 mins, 10 mins, 20 mins, 30 mins, 1 hour, or a time selected by a user). A status indicator 1108 can be included under the name of each user in the list 1104. The status indicator 1108 may provide information corresponding to the current state of each user. For example, if a user is participating in an audio room, the status indicator 1108 may include the title of the audio room and/or an indication of the user's role in the audio room (e.g., "Speaking" or "Listening"). Likewise, if a user is browsing the platform, the status indicator 1108 may indicate that the user is online (e.g., "Online"). For inactive users included in the list 1104, the status indicator 1108 may show the amount of time that has elapsed since the user was last active (e.g., "24 m ago"). The user 114 may select the room button 1106 next to each active user in the list 1104 to join (or request to join) the same audio room as the active user. If the user is not in an audio room (or inactive), the user 114 may select the room button 1106 next to each user to start (or request to start) a new audio room.

Figure 11B:
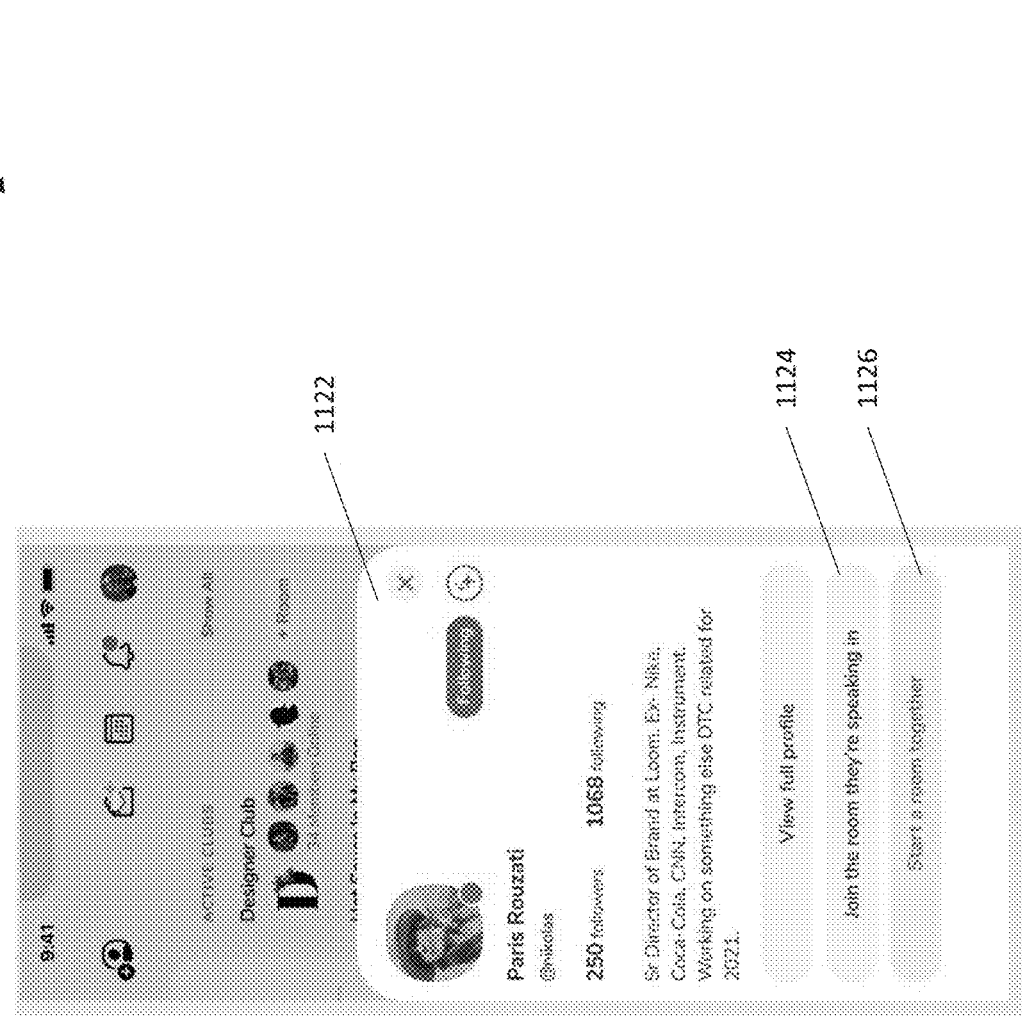

In some examples, the first user 114a can select each user included in the user list 1104 to view the user's profile. For example, FIG. 11B illustrates an example view 1120 of the user interface 120 including a user profile tab 1122. In one example, the user profile tab 1122 is displayed when the user 114 selects a user from the user list 1104. As shown, the user profile tab 1122 includes a join room button 1124 and a start room button 1126. If the selected user is speaking (or listening) in a live audio room, the user 114 may select the join room button 1124 to join (or request to join) the same audio room. Likewise, the user 114 can select the start room button 1126 to start (or request to start) a new audio room with the selected user. In some examples, the active club list 1102 and the active user list 1104 are managed and updated by the user engine 109.

Hand Raise Queue

As discussed above, audience members in an audio room 104 can request speaking privileges during the live audio conversation (e.g., via the speaker request button 414 of FIG. 4B). The requests may be granted by one or more speakers in the audio room 104. This request-based system prevents the moderators (e.g., speakers) from having to check with each audience member to see if they would like to participate in the discussion. However, the speakers may receive many requests during an audio room session, including requests from users that they do not recognize (i.e., strangers). As such, a hand raise queue system can be used to manage the requests received during a live audio discussion.

Figure 12A:
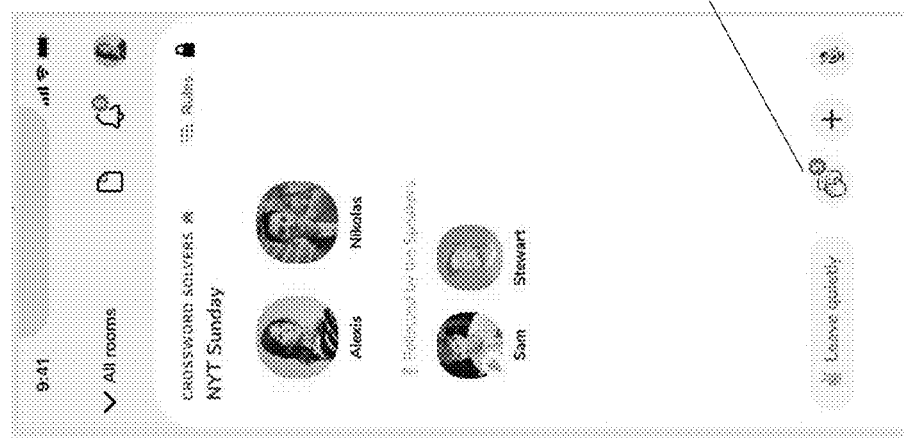
FIGS. 12A-12D illustrate a user interface of a client application in accordance with aspects described herein.
Figure 12B:
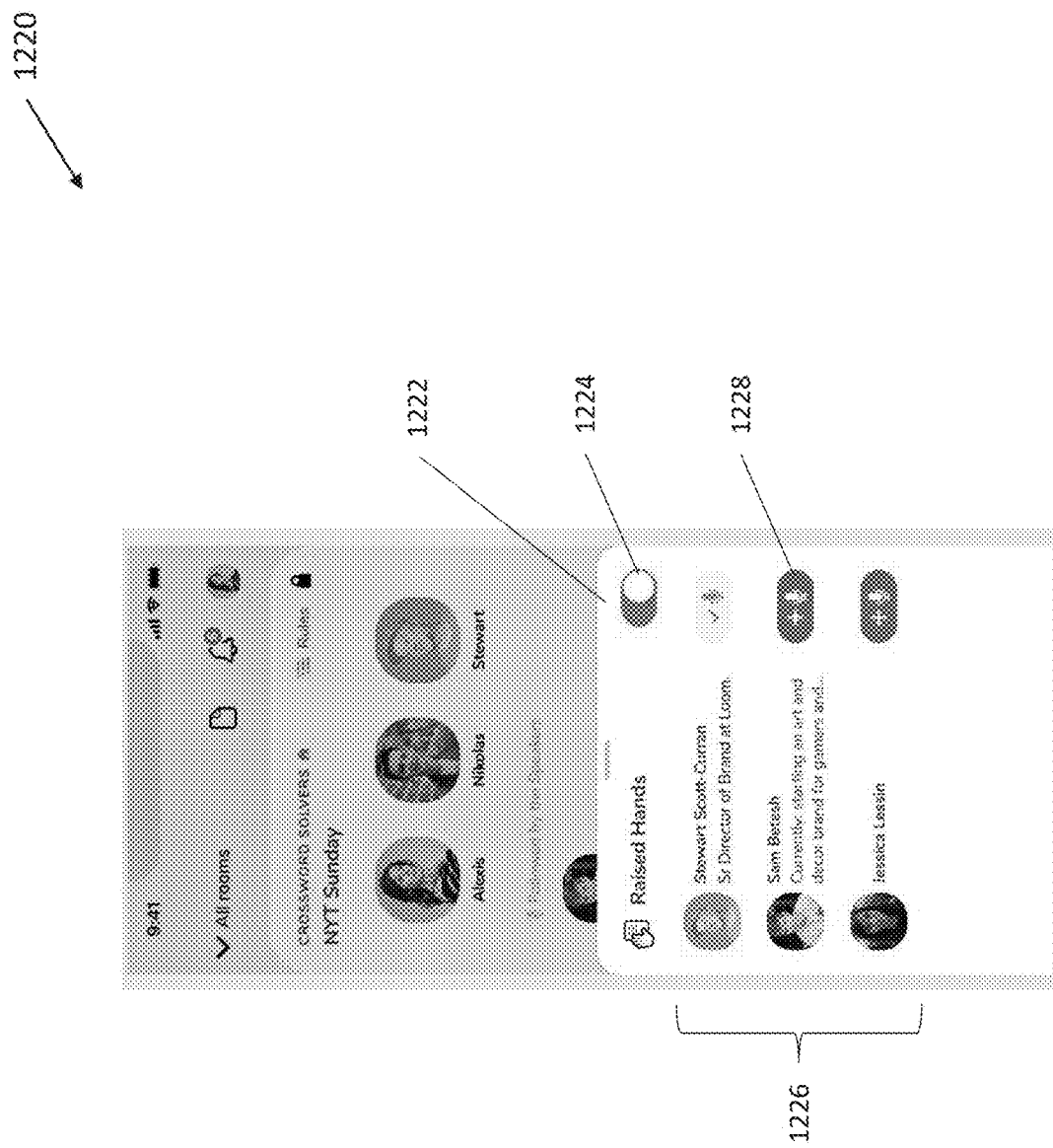

FIG. 12A is an example view 1200 of the user interface 120. In one example, the view 1200 corresponds to a live audio room 104 from the perspective of a speaker (e.g., user 114). As shown, a queue button 1202 is included allowing the user 114 to view the number of speaking requests received. In some examples, the user 114 can select the queue button 1202 to view the hand raise queue. For example, FIG. 12B illustrates an example view 1220 of the user interface 120 including a hand raise queue tab 1222. In one example, a hand raise toggle 1224 is included allowing the user 114 (or other speakers) to enable or disable hand raises (i.e., speaking requests). For example, hand raises may be disabled if the intention of the audio room is to keep the same set of speakers. If hand raises are enabled, a user list 1226 is displayed and dynamically updated as new speaking requests are received. In general, any suitable criteria can be used to determine the order in which speaking requests are displayed. In one example, users (i.e., audience members) are arranged in the user list 1226 based on the order in which the requests are received. In other words, the users who submitted the earliest speaking requests are displayed at the top of the list 1226 and the users who submitted the latest (or most recent) speaking requests are added to the bottom of the list 1226. In other examples, the users in the user list 1226 can be arranged using a weighting criteria. For example, users who co-follow one or more speakers and/or users who have a large number of followers (e.g., celebrities, athletes, etc.) may automatically be displayed at the top of the list 1226. In some examples, the users who can request to speak (i.e., join the queue) may be limited by the speaker(s). For example, the hand raise queue may be restricted to users who follow (or co-follow) one or more speakers. If the audio room is associated with a club, the hand raise queue may be restricted to users who are members of the club. The user 114 (or other speakers) can enable/disable speaking privileges by selecting a speech button 1228 next to each user in the list 1226.

Figure 12C:
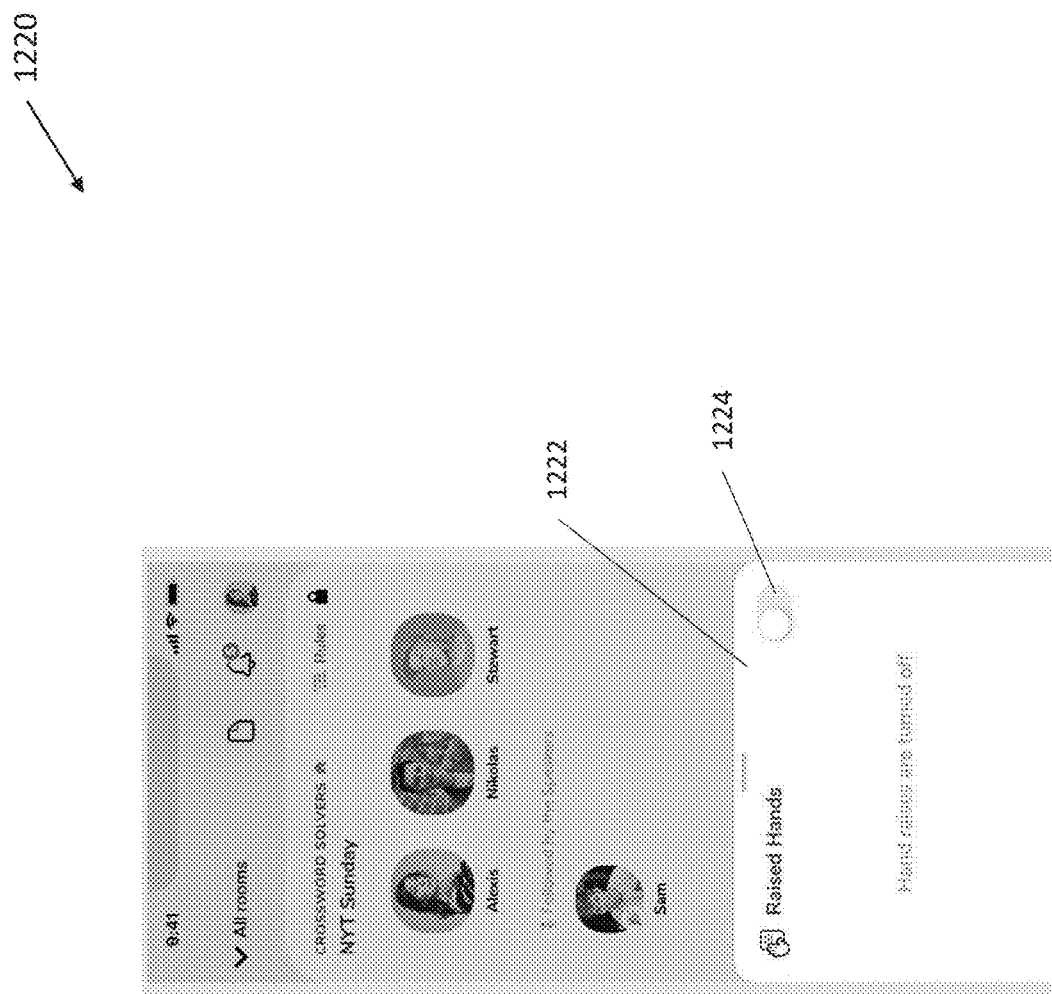
Figure 12D:
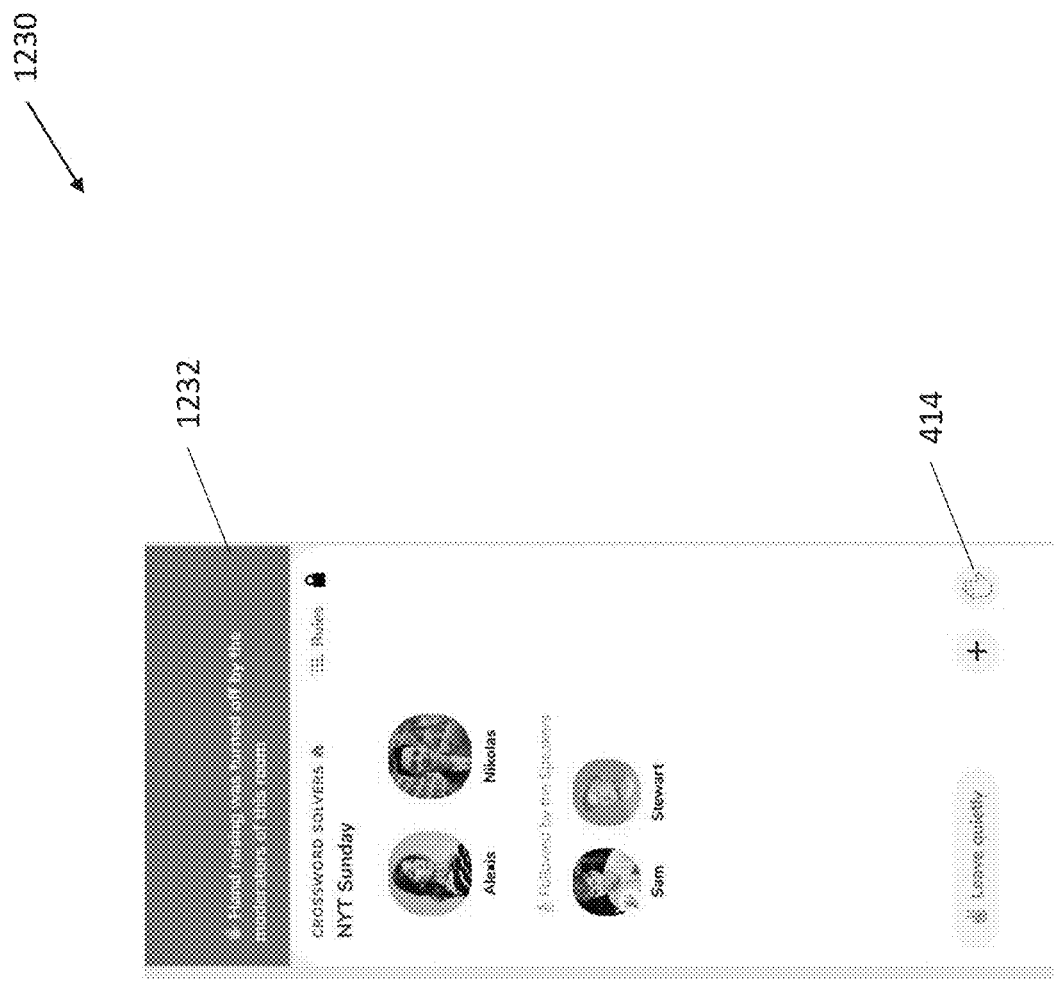

As shown in FIG. 12C, the user list 1226 is not displayed to the user 114 (or the other speakers) when hand raises are disabled (e.g., via the hand raise toggle 1224). In some examples, the state of the user list 1226 may be saved and restored if hand raises are re-enabled within a predefined window (e.g., less than 5 mins). In other examples, the hand raise queue is reset each time hand raises are enabled/disabled. The audience members may be notified or alerted each time hand raises are enabled/disabled. For example, FIG. 12D is an example view 1230 of the user interface 120 corresponding to a live audio room 104 from the perspective of an audience member. In one example, the user interface 120 is configured to display an alert (or toast) 1232 each time hand raises are enabled/disabled. In certain examples, the speaker request button 414 is enabled and disabled accordingly. In some examples, the hand raise queue is managed and updated by the room engine 106.

Hardware and Software Implementations

Figure 13:
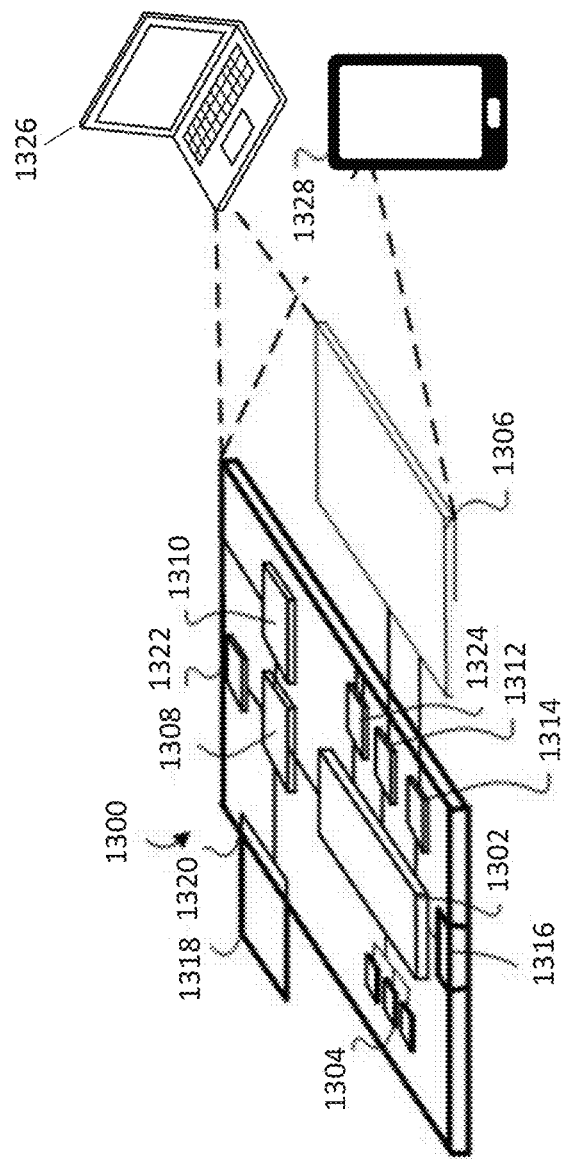
FIG. 13 illustrates an example computing device.

FIG. 13 shows an example of a generic computing device 1300, which may be used with some of the techniques described in this disclosure (e.g., as user devices 116a, 116b). Computing device 1300 includes a processor 1302, memory 1304, an input/output device such as a display 1306, a communication interface 1308, and a transceiver 1310, among other components. The device 1300 may also be provided with a storage device, such as a micro-drive or other device, to provide additional storage. Each of the components 1300, 1302, 1304, 1306, 1308, and 1310, are interconnected using various buses, and several of the components may be mounted on a common motherboard or in other manners as appropriate.

The processor 1302 can execute instructions within the computing device 1300, including instructions stored in the memory 1304. The processor 1302 may be implemented as a chipset of chips that include separate and multiple analog and digital processors. The processor 1302 may provide, for example, for coordination of the other components of the device 1300, such as control of user interfaces, applications run by device 1300, and wireless communication by device 1300.

Processor 1302 may communicate with a user through control interface 1312 and display interface 1314 coupled to a display 1306. The display 1306 may be, for example, a TFT LCD (Thin-Film-Transistor Liquid Crystal Display) or an OLED (Organic Light Emitting Diode) display, or other appropriate display technology. The display interface 1314 may comprise appropriate circuitry for driving the display 1306 to present graphical and other information to a user. The control interface 1312 may receive commands from a user and convert them for submission to the processor 1302. In addition, an external interface 1316 may be provided in communication with processor 1302, so as to enable near area communication of device 1300 with other devices. External interface 1316 may provide, for example, for wired communication in some implementations, or for wireless communication in other implementations, and multiple interfaces may also be used.

The memory 1304 stores information within the computing device 1300. The memory 1304 can be implemented as one or more of a computer-readable medium or media, a volatile memory unit or units, or a non-volatile memory unit or units. Expansion memory 1318 may also be provided and connected to device 1300 through expansion interface 1320, which may include, for example, a SIMM (Single In Line Memory Module) card interface. Such expansion memory 1318 may provide extra storage space for device 1300, or may also store applications or other information for device 1300. Specifically, expansion memory 1318 may include instructions to carry out or supplement the processes described above, and may include secure information also. Thus, for example, expansion memory 1318 may be provided as a security module for device 1300, and may be programmed with instructions that permit secure use of device 1300. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1304, expansion memory 1318, memory on processor 1302, or a propagated signal that may be received, for example, over transceiver 1310 or external interface 1316.

Device 1300 may communicate wirelessly through communication interface 1308, which may include digital signal processing circuitry where necessary. Communication interface 1308 may in some cases be a cellular modem. Communication interface 1308 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1310. In addition, short-range communication may occur, such as using a Bluetooth, WiFi, or other such transceiver (not shown). In addition, GPS (Global Positioning System) receiver module 1322 may provide additional navigation- and location-related wireless data to device 1300, which may be used as appropriate by applications running on device 1300.

Device 1300 may also communicate audibly using audio codec 1324, which may receive spoken information from a user and convert it to usable digital information. Audio codec 1324 may likewise generate audible sound for a user, such as through a speaker, e.g., in a handset of device 1300. Such sound may include sound from voice telephone calls, may include recorded sound (e.g., voice messages, music files, etc.) and may also include sound generated by applications operating on device 1300. In some examples, the device 1300 includes a microphone to collect audio (e.g., speech) from a user. Likewise, the device 1300 may include an input to receive a connection from an external microphone.

The computing device 1300 may be implemented in a number of different forms, as shown in FIG. 13. For example, it may be implemented as a computer (e.g., laptop) 1326. It may also be implemented as part of a smartphone 1328, smart watch, tablet, personal digital assistant, or other similar mobile device.

Some implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for generating an online audio discussion forum, comprising:
   receiving an indication that a first user is interested in speaking with one or more other users without sending a notification to the one or more other users that the first user is interested in speaking;
   saving the one or more other users to a first selection list;
   determining that a second user of the one or more other users is interested in speaking with the first user without sending a notification to the one or more other users that the second user is interested in speaking, wherein determining that the second user is interested in speaking with the first user includes:
   receiving an indication that the second user is interested in speaking with one or more other users;
   saving the one or more other users to a second selection list that is different than the first list;
   comparing the first list and the second list; and
   determining whether there is a match between the first list and the second list by detecting that the second user is included in the first selection list and the first user is included in the second selection list; and
   upon and in response to detecting that the second user is included in the first selection list and the first user is included in the second selection list, generating an audio discussion forum including the first user and the second user.

2. The method of claim 1, wherein generating the audio discussion forum including the first user and the second user includes sending an invite to join the audio discussion forum to the second user.

3. The method of claim 1, further comprising:
   displaying a first user list to the first user, the first user list including at least one user other than the first user; and
   displaying a second user list to the second user, the second user list including at least one user other than the second user.

4. The method of claim 3, further comprising:
   sorting the first user list based on criteria associated with the first user; and
   sorting the second user list based on criteria associated with the second user.

5. The method of claim 3, wherein receiving the indication that the first user is interested in speaking with the one or more other users includes receiving a selection by the first user of the one or more other users from the first user list.

6. The method of claim 3, wherein receiving the indication that the second user is interested in speaking with the one or more other users includes receiving a selection by the second user of the one or more other users from the second user list.

7. The method of claim 1, wherein receiving the indication that the first user is interested in speaking with the one or more other users includes receiving a selection by the first user of the one or more other users via a user profile corresponding to the one or more other users.

8. The method of claim 1, wherein receiving the indication that the second user is interested in speaking with the one or more other users includes receiving a selection by the second user of the one or more other users via a user profile corresponding to the one or more other users.

9. The method of claim 1, further comprising:
   receiving an indication that a third user is interested in speaking with one or more other users; and
   saving the one or more other users to a third selection list.

10. The method of claim 9, further comprising:
    comparing the first, second, and third selection lists; and
    sending an invite to the third user to join the audio discussion forum in response to a determination that the first selection list includes the second and third users, the second selection list includes the first and third users, and the third selection list includes the first and second users.

11. The method of claim 9, further comprising:
    comparing the first, second, and third selection lists; and
    sending an invite to the third user to join the audio discussion forum in response to a determination that the first selection list includes the third user and/or the second selection list includes the third user.

12. A system for generating an online audio discussion forum, comprising:
    at least one memory for storing computer-executable instructions; and
    at least one processor for executing the instructions stored on the memory, wherein execution of the instructions programs the at least one processor to perform operations comprising:
    receiving an indication that a first user is interested in speaking with one or more other users without sending a notification to the one or more other users that the first user is interested in speaking;
    saving the one or more other users to a first selection list;
    determining that a second user of the one or more other users is interested in speaking with the first user without sending a notification to the one or more other users that the second user is interested in speaking, wherein determining that the second user is interested in speaking with the first user includes:
    receiving an indication that the second user is interested in speaking with one or more other users;
    saving the one or more other users to a second selection list that is different than the first list;
    comparing the first list and the second list; and
    determining whether there is a match between the first list and the second list by detecting that the second user is included in the first selection list and the first user is included in the second selection list; and
    upon and in response to detecting that the second user is included in the first selection list and the first user is included in the second selection list, generating an audio discussion forum including the first user and the second user.

13. The system of claim 12, wherein generating the audio discussion forum including the first user and the second user includes sending an invite to join the audio discussion forum to the second user.

14. The system of claim 12, wherein execution of the instructions programs the at least one processor to perform operations further comprising:
 displaying a first user list to the first user, the first user list including at least one user other than the first user; and
 displaying a second user list to the second user, the second user list including at least one user other than the second user.

15. The system of claim 14, wherein execution of the instructions programs the at least one processor to perform operations further comprising:
 sorting the first user list based on criteria associated with the first user; and
 sorting the second user list based on criteria associated with the second user.

16. The system of claim 14, wherein receiving the indication that the first user is interested in speaking with the one or more other users includes receiving a selection by the first user of the one or more other users from the first user list.

17. The system of claim 14, wherein receiving the indication that the second user is interested in speaking with the one or more other users includes receiving a selection by the second user of the one or more other users from the second user list.

18. The system of claim 12, wherein receiving the indication that the first user is interested in speaking with the one or more other users includes receiving a selection by the first user of the one or more other users via a user profile corresponding to the one or more other users.

19. The system of claim 12, wherein receiving the indication that the second user is interested in speaking with the one or more other users includes receiving a selection by the second user of the one or more other users via a user profile corresponding to the one or more other users.

20. The system of claim 12, wherein execution of the instructions programs the at least one processor to perform operations further comprising:
 receiving an indication that a third user is interested in speaking with one or more other users; and
 saving the one or more other users to a third selection list.

21. The system of claim 20, wherein execution of the instructions programs the at least one processor to perform operations further comprising:
 comparing the first, second, and third selection lists; and
 sending an invite to the third user to join the audio discussion forum in response to a determination that first selection list includes the second and third users, the second selection list includes the first and third users, and the third selection list includes the first and second users.

22. The system of claim 20, wherein execution of the instructions programs the at least one processor to perform operations further comprising:
 comparing the first, second, and third selection lists; and
 sending an invite to the third user to join the audio discussion forum in response to a determination that first selection list includes the third user and/or the second selection list includes the third user.

* * * * *